(12) United States Patent
Coifman

(10) Patent No.: US 10,733,976 B2
(45) Date of Patent: *Aug. 4, 2020

(54) METHOD AND APPARATUS FOR IMPROVING THE TRANSCRIPTION ACCURACY OF SPEECH RECOGNITION SOFTWARE

(76) Inventor: Robert E. Coifman, Millville, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/924,418

(22) Filed: Sep. 27, 2010

(65) Prior Publication Data

US 2011/0153620 A1     Jun. 23, 2011

Related U.S. Application Data

(63) Continuation of application No. 11/584,904, filed on Oct. 23, 2006, now Pat. No. 7,805,299, and a continuation-in-part of application No. 11/510,435, filed on Aug. 25, 2006, now Pat. No. 7,809,565, which is a continuation-in-part of application No. 10/791,626, filed on Mar. 1, 2004, now Pat. No. 7,426,468.

(60) Provisional application No. 60/728,990, filed on Oct. 21, 2005, provisional application No. 60/711,391, filed on Aug. 25, 2005, provisional application No. 60/451,024, filed on Mar. 1, 2003.

(51) Int. Cl.
    *G10L 15/065*     (2013.01)

(52) U.S. Cl.
    CPC .................. *G10L 15/065* (2013.01)

(58) Field of Classification Search
    USPC ........................................... 704/235
    See application file for complete search history.

(56) References Cited

U.S. PATENT DOCUMENTS

| | | | | |
|---|---|---|---|---|
| 4,864,502 A | * | 9/1989 | Kucera | G06F 17/274 704/8 |
| 5,146,405 A | * | 9/1992 | Church | G06F 17/271 700/90 |
| 5,418,717 A | * | 5/1995 | Su | G06F 17/2715 704/9 |
| 5,799,276 A | * | 8/1998 | Komissarchik | G10L 15/04 704/207 |
| 6,026,388 A | * | 2/2000 | Liddy | G06F 17/30654 |

(Continued)

*Primary Examiner* — Huyen X Vo
*Assistant Examiner* — Timothy Nguyen
(74) *Attorney, Agent, or Firm* — Brian K. Johnson, Esq.

(57) ABSTRACT

A virtual vocabulary database is provided for use with a with a particular user database as part of a speech recognition system. Vocabulary elements within the virtual database are imported from the user database and are tagged to include numerical data corresponding to the historical use of the vocabulary element within the user database. For each speech input, potential vocabulary element matches from the speech recognition system are provided to the virtual database software which creates virtual sub-vocabularies from the criteria according to predefined criteria templates. The software then applies vocabulary element weighting adjustments according to the virtual sub-vocabulary weightings and applies the adjustment to the default weighting provided by the speech recognition system. The modified weightings are returned with the associated vocabulary elements to the speech engine for selection of an appropriate match to the input speech.

23 Claims, 15 Drawing Sheets

(56) References Cited

U.S. PATENT DOCUMENTS

| | | | | |
|---|---|---|---|---|
| 6,122,613 | A | * | 9/2000 | Baker ............... G10L 15/22 704/235 |
| 6,490,549 | B1 | * | 12/2002 | Ulicny ............. G06F 17/273 704/10 |
| 7,395,215 | B2 | * | 7/2008 | Grushka ........... G06F 19/322 600/200 |
| 7,805,299 | B2 | * | 9/2010 | Coifman .......... G10L 15/065 704/235 |
| 2002/0120451 | A1 | * | 8/2002 | Kato ............... G10L 15/1822 704/258 |
| 2003/0004724 | A1 | * | 1/2003 | Kahn ............... G10L 15/063 704/260 |
| 2003/0023440 | A1 | * | 1/2003 | Chu ................. G10L 15/19 704/249 |
| 2003/0154085 | A1 | * | 8/2003 | Kelley ............. G06F 17/243 704/275 |
| 2012/0079372 | A1 | * | 3/2012 | Kandekar ........ G06F 17/2745 715/256 |

\* cited by examiner

FIG. 5

| RECORD # | | USERS | WEIGHTING INFO | | STREET ADDRESS | |
|---|---|---|---|---|---|---|
| | | 554 | 552 | | 571 | |
| | | | | | | |
| 5 | | | 7 | | 10 WAYWARD LANE | ←510 |
| | | | | | | |
| 7 | | | 10 | | 15 BRANCH ST | ←511 |
| | | | | | | |
| 65 | | | 2 | | 555 5TH AVE | ←512 |
| | | | | | | |

FIG. 6

| RECORD # | CONTEXT (AGE) | CONTEXT (USER) | CONTEXT (FINDING) | WEIGHT (USE COUNT) | INTERPRETATIONS |
|---|---|---|---|---|---|
| 3 | | | | | PNEUMONIA |
| ... | | | | | |
| 12 | <3 | DR. BROWN | SWALLOWING | 5 | DYSPHAGIA |
| 13 | >50 | DR. SMITH | SPEECH | 2 | DYSPHASIA |
| | | | | | |
| | | | | | |
| | | | | | |

Columns: 654, 656, 658, 652, 615/616/617 (interpretations). Table 682.

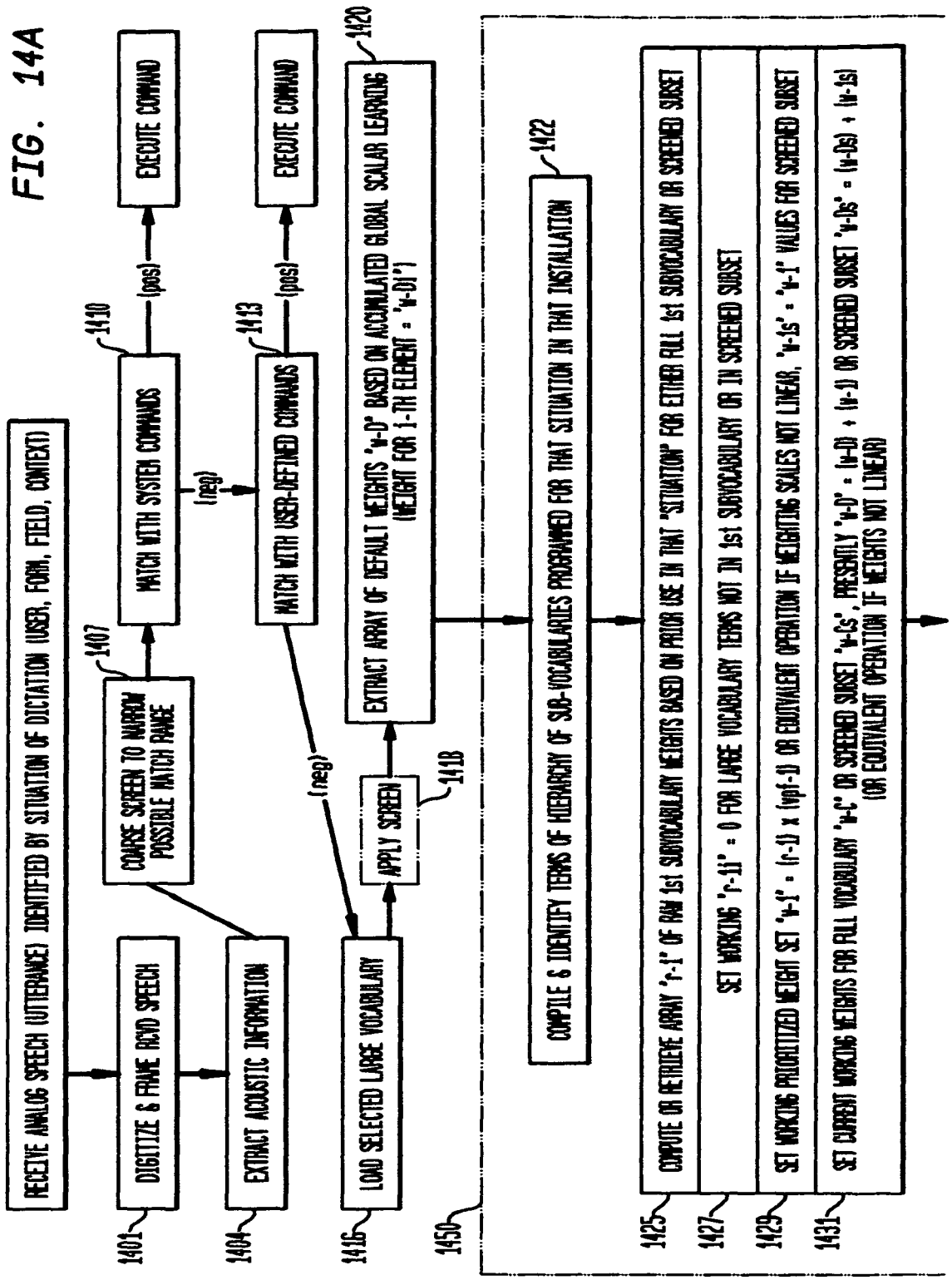

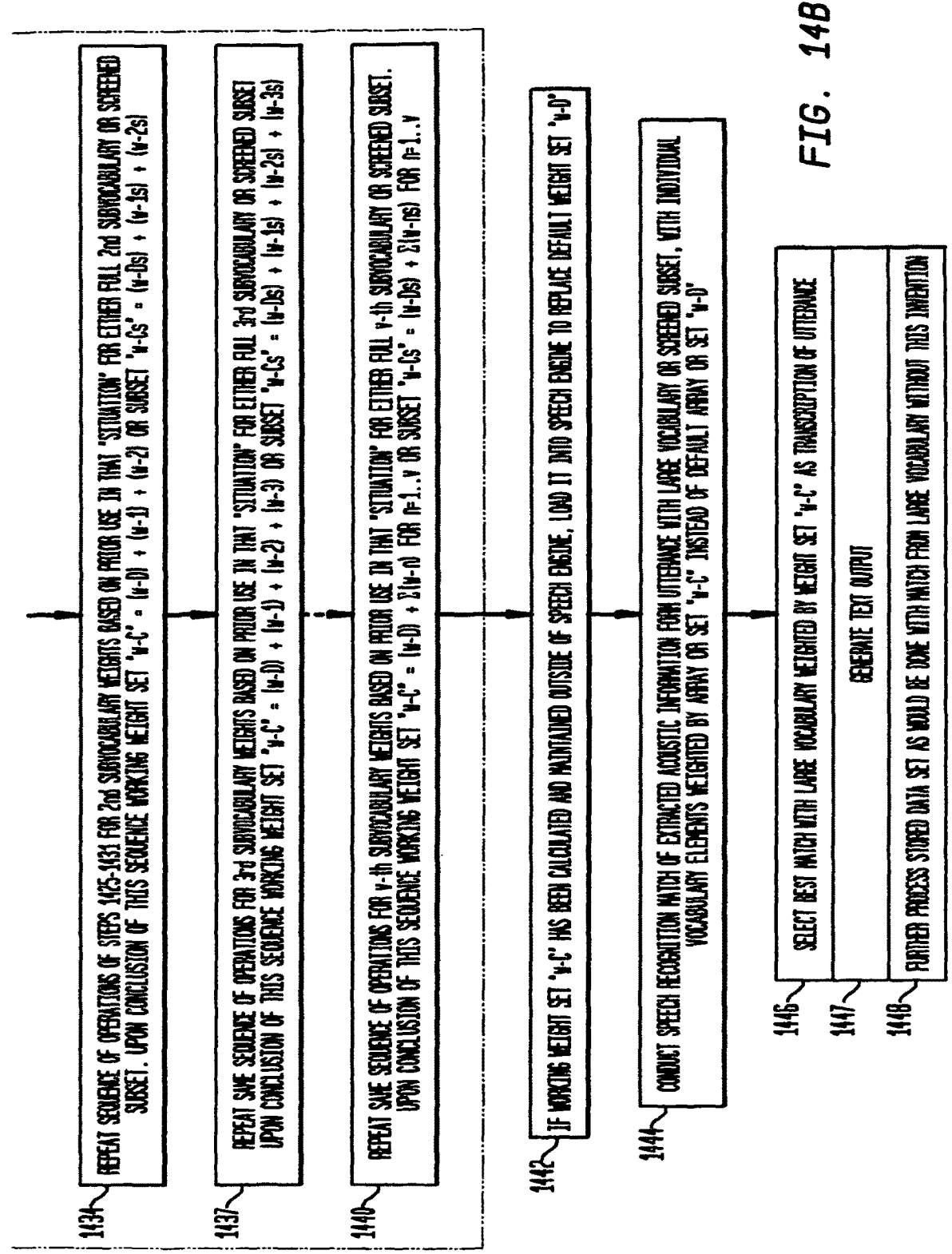

METHOD AND APPARATUS FOR IMPROVING THE TRANSCRIPTION ACCURACY OF SPEECH RECOGNITION SOFTWARE

CROSS-REFERENCE TO RELATED APPLICATIONS

This application is a continuation of U.S. patent application Ser. No. 11/584,904 filed on Oct. 23, 2006 entitled "Method and Apparatus for Improving the Transcription Accuracy of Speech Recognition Software," now U.S. Pat. No. 7,805,299, which claims the benefit of provisional patent application 60/728,990 filed on Oct. 21, 2005, which in turn is a continuation-in-part of U.S. patent application Ser. No. 11/510,435 filed on Aug. 25, 2006 entitled "Method and Apparatus for Improving the Transcription Accuracy of Speech Recognition Software," now U.S. Pat. No. 7,809,565 which claims the benefit of provisional patent application 60/711,391 filed on Aug. 25, 2005, which in turn is a continuation-in-part of U.S. patent application Ser. No. 10/791,626 filed on Mar. 1, 2004 now U.S. Pat. No. 7,426,468 entitled "Method and Apparatus for Improving The Transcription Accuracy of Speech Recognition Software," now U.S. Pat. No. 7,426,468, which claims the benefit of provisional patent application 60/451,024 filed on Mar. 1, 2003, all of which are incorporated by reference herein in their entirety.

BACKGROUND

Speech recognition systems, particularly computer-based speech recognition systems, are well known. Numerous inventions and voice transcription technologies have been developed to address various problems within speech recognition systems. In one aspect, advanced mathematics and processing algorithms have been developed to address the needs of translating vocal input into computer text through speech parsing, phoneme identification and database matching of the input speech so as to accurately transcribe the speech into text.

General speech recognition databases are also well known. U.S. Pat. No. 6,631,348 (Wymore), for example, discloses a speech recognition system in which vocal training information is provided to create different vocal reference patterns under different ambient noise levels. The Wymore invention creates a database of captured speech from this training input. During operation, a user of the Wymore system may then dictate speech under various ambient noise conditions and the speech recognition system properly filters the noise from the user's input speech based on the different stored models to determine the appropriate, spoken words, thereby improving the accuracy of the speech transcription.

U.S. Pat. No. 6,662,160 (Chien et al.) also discloses a system involving adaptive speech recognition methods that include noise compensation. Like Wymore, the system of Chien et al. neutralizes noise associated with input speech through the use of preprocessed training input. Chien et al. employs complex statistical mathematical models (e.g. Hidden Markov Models) and applies optimal equalization factors in connection with feature vectors and probability density functions related to various speech models so as to accurately recognize a user's speech.

Other voice transcription systems address the problems of minimizing and correcting misrecognition errors. For example, U.S. Pat. No. 6,195,637 (Ballard at al.) discloses a transcription system that accepts a user's dictation and contemporaneously allows a user to mark misrecognized words during the dictation. At the conclusion of dictation, a computer-based, textual correction tool is invoked with which the user may correct the marked, misrecognized words. Numerous, potentially intended words, e.g. words that are close in phonetic distance to the actual speech, are provided by the Ballard at al. system for possible replacement of the misrecognized word. Other examples of misrecognized words include incorrectly spelled words and improperly formatted words, (e.g. lack of upper case, letters in a name or incorrect punctuation). In one embodiment, Ballard at al. discloses a computer having a windows-based, graphical user interface that displays the list of potentially intended words from which the user selects the appropriate word with a graphical input device, such as a computer mouse.

Other existing speech recognition systems deal with problems associated with large, speech recognition vocabularies, i.e. the entire English language. These systems typically address the allocation of the computer-based resources required to solve the speech recognition problems associated with such a vocabulary. U.S. Pat. No. 6,490,557 (Jeppesen), for example, discloses a system and method for recognizing and transcribing continuous speech in real time. In one embodiment, the disclosed speech recognition system includes multiple, geographically distributed, computer systems connected by high speed links. A portion of the disclosed computer system is responsible for preprocessing continuous speech input, such as filtering any background noise provided during the speech input, and subsequently converting the resultant speech signals into digital format. The digital signals are then transcribed into word lists upon which automatic speech recognition components operate. Jeppeson's speech recognition system is also trainable so as to accommodate more than one type of voice input, including vocal input containing different accents and dialects. Thus, this speech recognition system is capable of recognizing large vocabulary, continuous speech input in a consistent and reliable manner, particularly, speech that involves variable input rates and different dialects and accents. Jeppesen further discloses systems having on-site data storage (at the site of the speech input) and off-site data storage which stores the databases of transcribed words. Thus, in one aspect, a primary advantage of Jeppesen is that a database of large scale vocabularies containing speech dictations is distributed across different geographical areas such that users employing dialects and accents within a particular country or portion of the world would be able to use localized databases to accurately transcribe their speech input.

Other large vocabulary speech recognition systems are directed to improving the recognition of dictated input through the use of specialized, hierarchically arranged, vocabularies. The computerized, speech recognition system of U.S. Pat. No. 6,526,380 (Thelan et al.), for example, employs a plurality of speech recognition models that accept incoming speech in parallel and attempts to match the speech input within specific databases. Since the English language vocabulary, for example, is relatively large, the speech matching success rate using such a large vocabulary for any given particular dictation may be lower than what is acceptable for a particular application. Thelan et al. attempts to solve this problem through the use of specific vocabularies selected by the voice recognition modules after a particular speech vocabulary and associated text database is determined to be more appropriately suited to the dictation at issue. Thus, Thelan et al. begins with an ultra-large vocabulary and narrows the text selection vocabularies depending on the speech input so as to select further refined vocabularies that provide greater transcription accuracy. Model selectors are operative within Thelan et al. to enable the recognition of more specific models if the specific models obtain good recognition results. These specific models may then be used as replacement for the more generic vocabulary model. As with Jeppesen, Thelan et al. discloses computer-based speech recognition system having potentially distributed vocabulary databases.

Heretofore, no computerized speech recognition systems have been developed that take advantage of repeated dictation of specific terms into specific form fields or repeated dictation of specific terms by specific persons. In particular, context-specific vocabularies or context-specific modifications of matching probabilities have not been provided with respect a context specific vocabulary which is used on conjunction with more general vocabularies. The modern necessity of using specific, computerized, form-based input creates a unique problem in that the general vocabularies used by many of the commercial speech recognition software programs do not provide efficient and accurate recognition and transcription of users' input speech. The limitations of the present systems lie in the fact that any vocabulary large enough to accommodate general as well as specific text will have phonetically similar general text so as to cause an unacceptably high error rate.

SUMMARY OF THE INVENTION

According to a preferred embodiment of the invention, a method for improving the accuracy of a computerized, speech recognition system, the speech recognition system including a base vocabulary, the method includes loading a specified vocabulary into computer storage, the specified vocabulary associated with a specific context; accepting a user's voice input into the speech recognition system; evaluating the user's voice input with data values from the specified vocabulary according to an evaluation criterion; selecting a particular data value as an input into a computerized form field if the evaluation criterion is met and if the user's voice input does not meet the evaluation criterion, selecting a data value from the base vocabulary as an input into the computerized form field. According to further aspects of the invention, the method further includes evaluating the user's voice input with data values from the base vocabulary according to a base evaluation criterion if the user's voice input does not meet the evaluation criterion. According to another aspect of the invention, the evaluation criterion is a use weighting associated with the data values. As yet another aspect, the step of evaluating further includes the step of applying a matching heuristic against a known threshold. According to another aspect of the invention, and further, the step of applying a matching heuristic further includes a step of comparing the user's voice input to a threshold probability of matching an acoustic model derived from the specified vocabulary. In still other aspects of the invention, the context is associated with any one or more of the following: a topical subject, a specific user, and a context are associated with a field.

According to another preferred embodiment of the invention, a method for improving the accuracy of a computerized, speech recognition system is provided that include the steps of loading a first specified vocabulary into computer storage, the first specified vocabulary associated with a first computerized form field; accepting a user's voice input into the speech recognition system; evaluating the user's voice input with data values from the first specified vocabulary according to an evaluation criterion; selecting a particular data value as input into the first computerized form field if the user's voice input meets the evaluation criterion; loading a second specified vocabulary into computer storage, the second specified vocabulary associated with a second computerized form field; accepting a user's voice input into the speech recognition system; evaluating the user's voice input with against data values from the specified vocabulary according to an evaluation criterion; and selecting a particular data value as input into a second computerized form field if the user's voice input meets the evaluation criterion. In one aspect, the evaluation criterion for the steps of evaluating the first and the second specified vocabularies are the same. In another aspect, the evaluation criterion for the steps of evaluating the first and the second specified vocabularies are different criterion. In still another aspect, the first and second computerized form fields are associated with different fields of a computerized medical form.

In yet another embodiment the present invention provides a method for improving the accuracy of a computerized, speech recognition system that includes loading a first specified vocabulary into computer storage, the first specified vocabulary associated with a first user of the speech recognition system; accepting the first user's voice input into the speech recognition system; evaluating the first user's voice input with data values from the first specified vocabulary according to an evaluation criterion; selecting a particular data value as an input into a computerized form field if the first user's voice input meets the evaluation criterion; loading a second specified vocabulary into computer storage, the second specified vocabulary associated with a second user of the speech recognition system; accepting a second user's voice input into the speech recognition system; evaluating the second user's voice input with data values from the specified vocabulary according to an evaluation criterion; and selecting a particular data value as an input into the computerized form field if the second user's voice input meets the evaluation criterion. In one aspect, the first and second users of the speech recognition system are different doctors and the computerized form fields are associated with a field within a computerized medical form.

In still another embodiment of the present invention, a method is provided for improving the accuracy of a computerized, speech recognition system that includes loading a first specified vocabulary into computer storage, the first specified vocabulary associated with a first context used within the speech recognition system; accepting a user's voice input into the speech recognition system; evaluating the user's voice input with data values from the first specified vocabulary according to an evaluation criterion; selecting a particular data value as an input into a computerized form field if the user's voice input meets the evaluation criterion; loading a second specified vocabulary into computer storage, the second specified vocabulary associated with a second context used within the speech recognition system, accepting the user's voice input into the speech recognition system; evaluating the user's voice input with data values from the specified vocabulary according to an evaluation criterion; and selecting a particular data value as an input into the computerized form field if the user's voice input meets the evaluation criterion. In one aspect, the first context is a patients age and the second context is a patient diagnosis of the patient.

In still another embodiment of the present invention, a computerized speech recognition system is provided including a computerized form including at least one computerized form field; a first vocabulary database containing data entries for the computerized form field, the first vocabulary associated with a specific criterion; a second vocabulary database containing data entries for the data field; and an input for accepting a user's vocal input, the vocal input being compared to the first vocabulary as a first pass in selecting an input for the computerized form field, and the vocal input being compared to the second vocabulary as a second pass in selecting an input for the computerized form field. In one aspect, the criterion is one or more of the following: a topical context, a specific user of the speech recognition system, a form field. In another aspect, the first vocabulary database is a subset of the second vocabulary database.

In yet another embodiment of the present invention, a database of data values for use in a computerized speech recognition system is provided including a first vocabulary database containing data entries for a computerized form including at least one computerized form field, the first vocabulary associated with a specific criterion; and a second vocabulary database containing data entries for the data field. In one aspect, the criterion is one or more of the following: a topical context, a specific user of the speech recognition system, a field.

According to another preferred embodiment of the method of an enhanced speech recognition system the method includes a process of vocabulary element matching including the steps of loading a first vocabulary; evaluating individual vocabulary elements within the first vocabulary to determine a first vocabulary match set, each vocabulary element within the first vocabulary match set having a match probability score; weighting the match probability scores of the vocabulary elements within the first vocabulary match set with a first vocabulary weighting factor; loading a second vocabulary; evaluating individual vocabulary elements within the second vocabulary to determine a second vocabulary match set, each vocabulary element within the second vocabulary match set having a match probability score; combining the individual vocabulary elements within the first and second vocabulary match sets so as to create a combined set of vocabulary elements; weighting the match probability scores of the combined set of vocabulary elements with a second vocabulary weighting factor; and selecting as a match to an input to the computerized speech recognition system a vocabulary element from the combined set of vocabulary elements based on the weighted match probability scores of the combined set of vocabulary elements. The enhanced method may also include the steps of reducing a size of the combined set of vocabulary elements to create a reduced combined set of vocabulary elements or the steps of loading a third vocabulary; evaluating individual vocabulary elements within the third vocabulary to determine a third vocabulary match set, each vocabulary element within the third vocabulary match set having a match probability score; and combining the individual vocabulary elements with the combined set of vocabulary elements so as to create a new combined set of vocabulary elements.

According to particularly preferred aspects of the enhanced method, the first and second weighting functions are linear scaling factors and the step of weighting includes the step of multiplying the match probability score by the linear scaling factors or the first and second weighting functions are non-linear scaling factors and the step of weighting includes the step of applying the non-linear scaling factor to the match probability score. According to yet other aspects of the enhanced method, the first and second vocabularies may be selected based on the previously input text of a user of the speech recognition system and/or the previously input text used in a particular form field being populated by the speech recognition system, or are selected according to a speech context being used by a user of the speech recognition system, or any combination of these or other criteria.

According to another preferred embodiment of the method of an enhanced speech recognition system the method includes loading a first vocabulary; evaluating individual vocabulary elements within the first vocabulary to determine a first vocabulary match set, each vocabulary element within the first vocabulary match set having a match probability score; loading a second vocabulary; evaluating individual vocabulary elements within the second vocabulary to determine a second vocabulary match set, each vocabulary element within the second vocabulary match set having a match probability score; combining the individual vocabulary elements within the first and second vocabulary match sets so as to create a combine set of vocabulary elements; weighting the match probability scores of the combine set of vocabulary elements with a non-linear vocabulary weighting function; evaluating individual vocabulary elements within the combined set of vocabulary elements to determine a combined vocabulary match set based on the non-linearly weighted match probability scores of the vocabulary element within combined set of vocabulary elements; and selecting as a match to an input to the computerized speech recognition system a vocabulary element from the combine set of vocabulary elements based on the weighted match probability scores of the combine set of vocabulary elements. The enhanced method may also including the steps of applying the non-linear weighting function to the match probability scores of the vocabulary elements within the first and second vocabulary match sets; calculating a first altered match probability score for the vocabulary elements within the first vocabulary match set; deriving a second altered match probability score for the vocabulary elements within the second vocabulary match set; and deriving modified first and second match probability scores for the vocabulary elements within the combined set of vocabulary elements.

BRIEF DESCRIPTION OF THE DRAWINGS

The invention and its wide variety of potential embodiments will be readily understood via the following detailed description of certain exemplary embodiments, with reference to the accompanying drawings in which:

FIG. 5 is a graphical depiction of one specific, text string database according to one embodiment of the present invention.

FIG. 6 is a graphical depiction of another specific, text string database according to one embodiment of the present invention;

FIG. 14 is another process flow diagram for the speech recognition system according to another embodiment of the present invention.

DETAILED DESCRIPTION

Specific examples of the present invention are provided within the following description. Persons of skill in the art will recognize that these are merely specific examples and that more general uses for the present invention are possible. Specifically, in the examples that follow, the present invention is generally described as it pertains to speech recognition within the medical field and as it may be used within a medical office. It is easily understood and recognized that other applications of the present invention exist in other fields of use, including use in a general web-based form, or web page. Further, the system of the present invention is described as being implemented in software, but hardware and firmware equivalents may also be realized by those skilled in the art. Finally, the pronoun, "he", will be used in the following examples to mean either "he" or "she", and "his", will be used to mean either "his" or "her".

Figure 1:
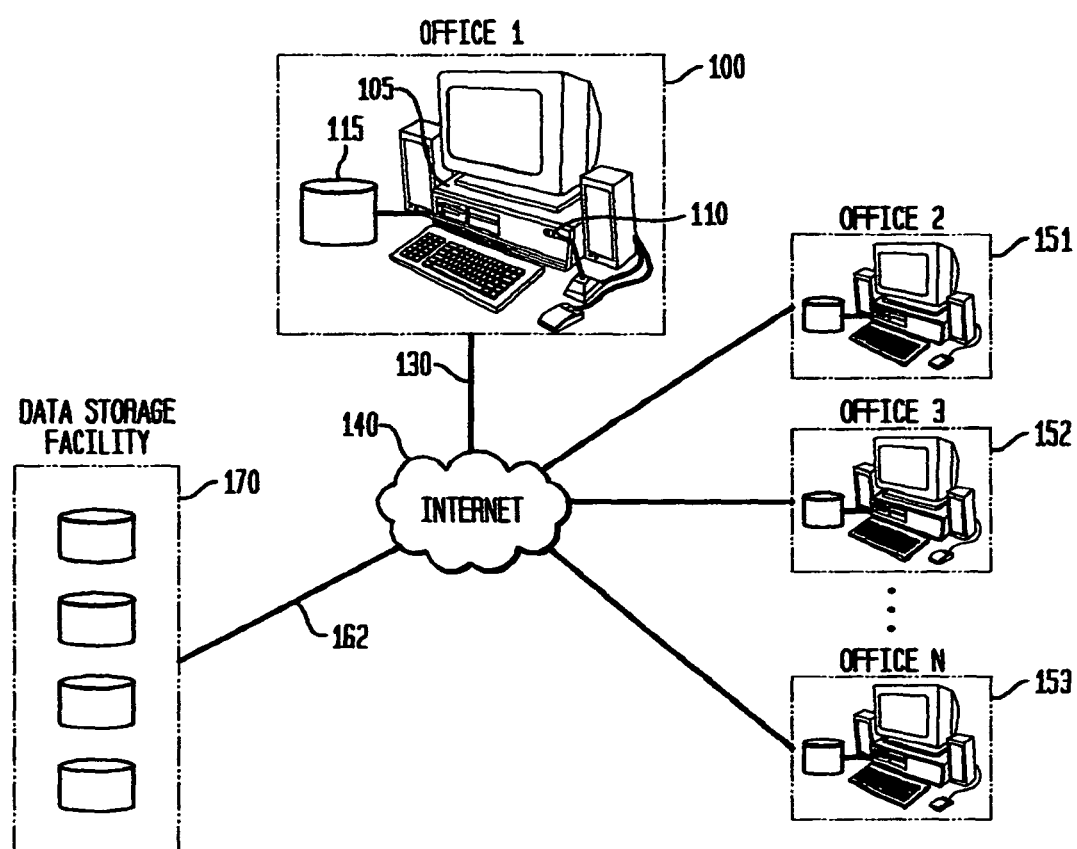
FIG. 1 is a general network diagram of the computerized speech recognition system according to one embodiment of the present invention.

FIG. 1 shows a general office environment including a distributed computer network for implementing the present invention according to one embodiment thereof. Medical office 100 includes computer system 105 that is running speech recognition software, microphone input 110 and associated databases and memory storage 115. The computerized system within office 1 may be used for multiple purposes within that office, one of which may be the transcription of dictation related to the use of certain medical forms within that office. Office 1 and its computer system(s) may be connected via a link 130 to the Internet in general, 140. This link may include any know or future devised connection technology including, but not limited to broadband connections, narrow band connections and/or wireless connections. Other medical offices, for example offices 2 through N, 151-153, may also be connected to one another and/or to the internet via data links 140 and thus to office 1. Each of the other medical offices may contain similar computer equipment, including computer equipment running speech recognition software, microphones, and databases. Also connected to internet 140 via data link 162 is data storage facility 170 containing one or more speech recognition databases for use with the present invention.

Figure 2:
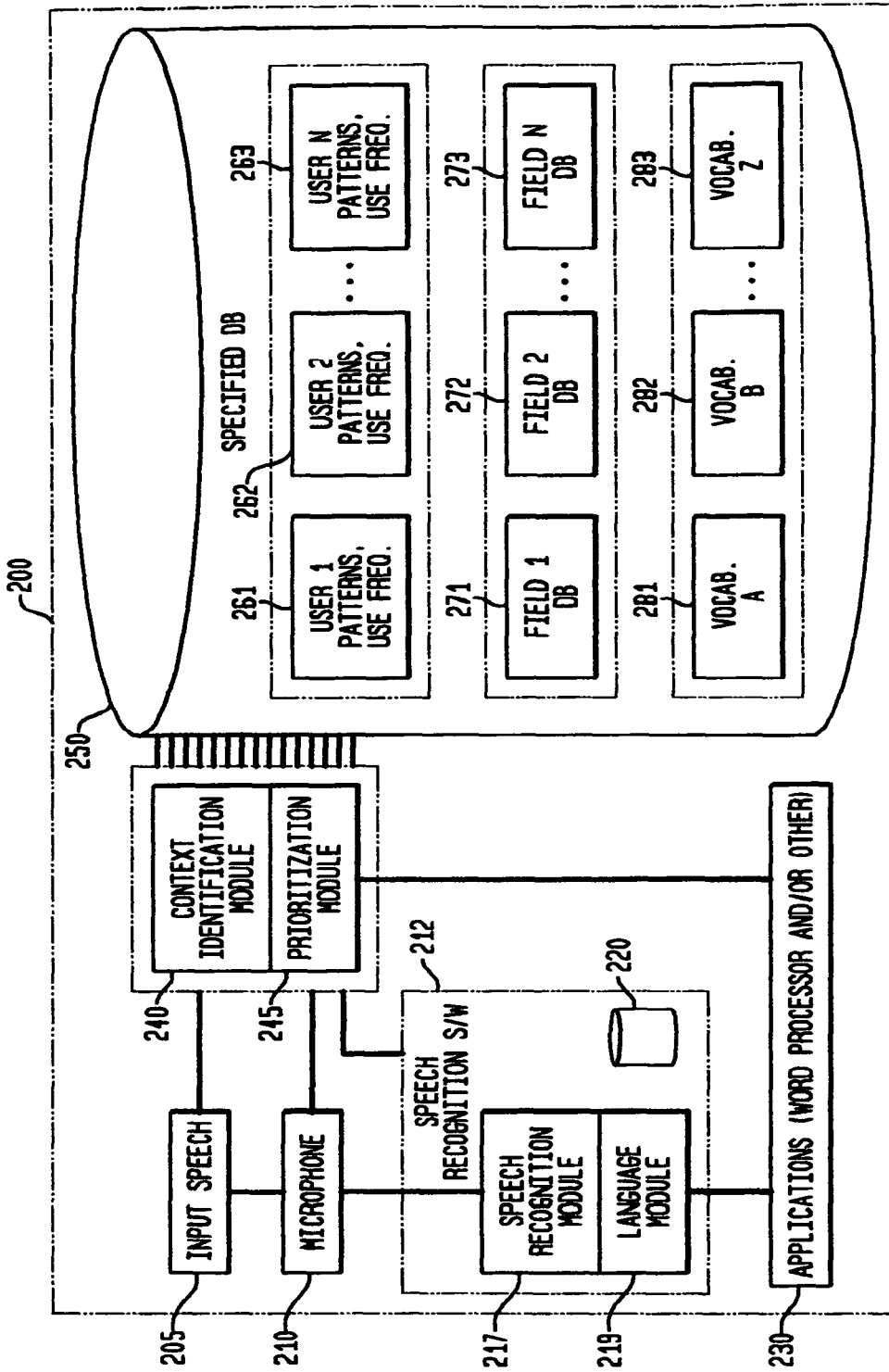
FIG. 2 is a system architecture diagram of a speech recognition system according to one embodiment of the present invention.

FIG. 2 provides a diagram of a high-level system architecture for the speech recognition system 200 according to one embodiment of the present invention. It should be recognized that any one of the individual pieces and/or subsets of the system architecture may be distributed and contained within any one or more of the various offices or data storage facilities provided in FIG. 1. Thus, there is no preconceived restriction on where any one of the individual components within FIG. 2 resides, and those of skill in the art will recognize various advantages by including the particular components provided in FIG. 2 in particular geographic and data-centric locations shown in FIG. 1.

Referring to FIG. 2, input speech 205 is provided to the speech recognition system via a voice collection device, for example, a microphone 210. Microphone 210 in turn is connected to the computer equipment associated with the microphone, shown as 105 in FIG. 1. Computer system 105 also includes a speech recognition software system 212. Numerous, commercial speech recognition software systems are readily available for such purpose including, but not limited to, ViaVoice offered by IBM and Dragon Naturally Speaking offered by ScanSoft. Regardless of the manufacturer of the product, the speech recognition software includes, generally, a speech recognition module 217 which is responsible for parsing the input speech 205 as digitized by the microphone 210 according to various, well-known speech recognition algorithms and heuristics. Language model 219 is also typically included with speech recognition software 212. In part, the language model 219 is responsible for parsing the input speech according to various algorithms and producing fundamental language components. These language components are typically created in relation to a particular language and/or application of interest, which the speech recognition system then evaluates against a textual vocabulary database 220 to determine a match. In frame-based systems, for example, incoming analog speech is digitized and the amplitude of different frequency bands are stored as dimensions of a vector. This is performed for each of between 6,000 and 16,000 frames per second and the resulting temporal sequence of vectors is converted, by any of various means, to a series of temporally overlapping "tokens" as defined in U.S. Pat. No. 6,073,097, which is incorporated herein by reference in its entirely. These tokens are then matches with similar temporal sequences of vectors generated from strings of text in the active vocabulary according to the active language model and any active set of "learned" user-specific phonetic patterns and habits.

General text database 220 is typically included as part of speech recognition software 212 and includes language text that is output by the speech recognition software once a match with the input speech is made. General or base vocabulary database 220 may contain the textual vocabulary for an entire language, e.g. English. More typical, however, the base vocabulary database contains a sizable subset of a particular language or desired application, e.g. hundreds of thousands of words. Those of skill in the arts of database management and computer science will realize that certain inherent computational difficulties and computer processing problems exist in the use and management of databases of this size. The principal barrier to accurate speech matching (recognition) with large vocabularies is "background noise" in the form of sufficient numbers of phonetically similar text mismatches in the vocabulary to give an unacceptable frequency of transcription errors. Other problems include the latency associated with full database searches for textual matches corresponding to input speech and the time and computer processing resources that must be expended within applications in which the base vocabulary database is swappable and must be replaced. These problems will arise, for example, with rapid swapping of large vocabulary databases in different languages.

Following a textual match from the speech input by speech recognition system 212, the text output from base vocabulary database 220 is then provided as input to any one of a number of other computer-based applications 230 into which the user desires the text. Examples of typical computer applications that are particularly suited for use with speech recognition software include, but are not limited to word processors, spreadsheets, command systems and/or transcription systems that can take advantage of a user's vocal input. Alternatively, as more text-based applications accompany people's use of the Internet, for example, such vocal input may be used to provide inputs to text field within a particular form, field or web page displayed by an internet browser.

Although the initial applications of the present invention are directed to voice-to-text applications in which vocal input is provided and textual output is desired, other applications are envisioned in which any user or machine provides an input to a recognition system, and that recognition system provides some type of output from a library of possible outputs. Examples of such applications include, but are not limited to a search and match of graphical outputs based on a user's voice input or an action-based output (e.g. a computer logon) based on a vocal input. One example of an action-based output may be to provide access to one of several computer systems, the list of computer systems being stored in a database of all accessible computer systems based on a user's bio-input (e.g. fingerprint) or a machines' mechanical input (e.g. a login message from a computer).

Referring again to FIG. 2, the speech recognition/voice transcription system of the present invention further includes a specified database of text string values that provide a first-pass output in response to a particular speech input against which the system attempts to determine a match. These text strings may be stored in any one of a number of formats and may be organized in any one of a number of manners depending on the practical application of the system. In one particularly preferred embodiment, the text strings within specified database 250 are provided from the vocal inputs of previous users of the speech recognition system. Using the Doctor's office example shown in of FIG. 1, the first-pass text strings may be organized by users (e.g. doctors) of the system such that those text strings used by a particular doctor are loaded by the system as first-pass potential matches when that particular doctor logs into the system and/or his vocal speech is recognized and identified by the system as belonging to that doctor. Sub-databases 261, 262 and 263 illustrate such an organization based on users of the system.

Figure 3:
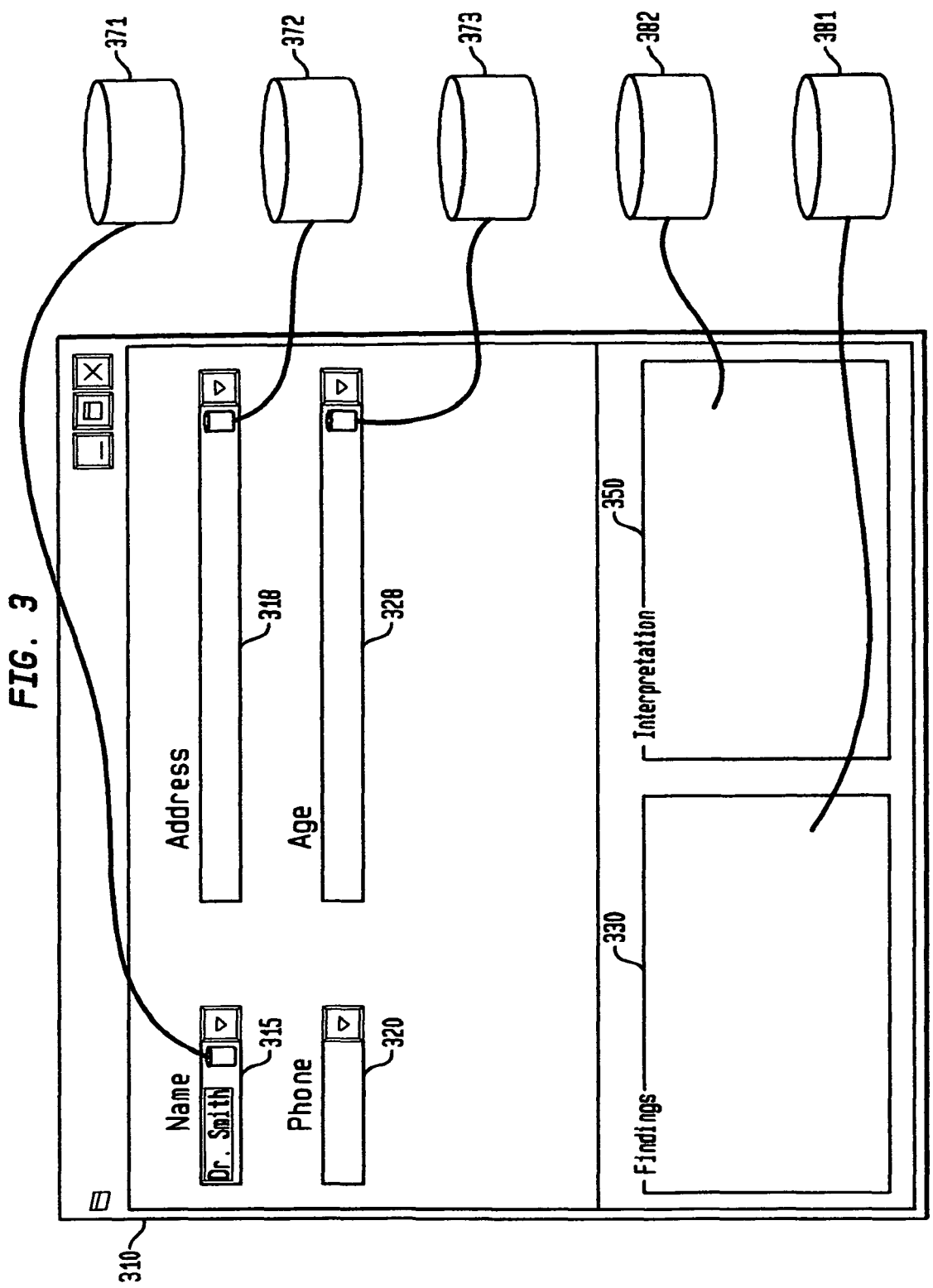
FIG. 3 shows an arrangement of a graphical user interface display and associated data bases according to one embodiment of the present invention.

Specified database 250 may also be organized according to numerous other criteria that may be advantageous to users of the speech recognition system of the present invention. In another arrangement, the sub-databases of first-pass text strings within first-pass, specified database 250 may be organized by fields within a computerized or web-based electronic form. Using the example of a doctors office once again and referring to FIG. 3, text input may need to be input into a medical form 310, that includes a patients name, shown in computerized form field 315, the patients address, shown in computerized form field 318, the patient's phone number, shown in computerized form field 320, and the patient's age, shown in computerized form field 320. Sub-databases 371, 372 and 373 shown in FIG. 3 are specific examples of the general field sub-databases 271, 272 and 273 of FIG. 2. These sub-databases provide first-pass text strings for matching speech input provided by the doctor when populating form fields 315, 318 and 328 (FIG. 3) respectively.

As yet another example of sub-database organization within specified database 250, a context associated with some aspect of the present speech input (or even past speech input) may be used to organize and condition the data into appropriate first-pass sub-databases. For example, the sub-database 381 associated with the findings field 330 within the medical form of FIG. 3 may be conditioned upon both the history and the age of the patient under the presumption that previous findings related to a particular combination of history and age group, either within an individual medical office or in general, are more likely to be repeated in future speech inputs with respect to patients having the same combination of age range and history. As one example, the findings fields populated within a form in the office practice of a primary care physician, with a history of abdominal pain and characteristic physical findings may be quite similar for the following two conditions: "appendicitis" as a probable "Interpretation" field for patients age 5-12; and "diverticulitis" as a probable "Interpretation" for patients age 75+. Characteristic findings (abdominal pain with what is called "rebound tenderness") will be stored in sub-database 381 and provided to "findings" field 330, while "appendicitis" and "diverticulitis" will be stored in sub-database 382 and provided to "Interpretation" field 350.

Specified database 250 may be created and organized in any number of ways and from any one of a number of sources of information so as to provide an accurate first-pass database for appropriate and efficient use within a particular context. If, for example, specified database 250 contains text strings organized by users of the system (a user context) under the statistical presumption that each specific doctor is more likely to repeat his or her own relatively recent utterances than earlier utterances, in situations when all other system parameters are the same, and more likely to repeat terms used by other system users or other physicians in the same specialty under otherwise identical circumstances, than to use terms neither they nor others have used in that situation, text from their own past dictations or those of others (whether manually or electronically transcribed) may be used to populate and arrange the text string values within the database. If, however, a high probability first-pass database is used to provide text strings to be input into particular fields within a computerized form, then these data values may be derived and input from previously filled-out forms. These data may then be organized into sub-databases according to form fields, for example as shown in FIG. 3 by sub-databases 371-381. Also, the specified database 250 may contain one, many or all such data for use within a particular desired context and output application. Finally, the actual data values within the database may be dynamically updated and rearranged into different sub-databases during the actual use of the speech recognition system so as to accommodate any particularly desirable speech recognition situation. In the most useful instances, the data values that populate the specified database 250 will be obtained from historical data and text strings that accompany a particular use and application of the speech recognition system.

Supplemental data may also accompany the data values and text strings stored within specified database 250. In particular, weightings and prioritization information may be included as part of the textual data records that are to be matched to the input speech. These weightings may help determine which data values are selected, when several possible data values are matched as possible outputs in response to a particular speech input. Further, these weighting and prioritization information may be dynamically updated during the course of the operation of the speech recognition system to reflect prior speech input. Those of skill in the art will realize a plurality of ways in which the data elements within the specified database may be rearranged and conditioned so as to provide an optimal first-pass database for use in the speech recognition system of the present invention.

Referring again to FIG. 2, the speech recognition/voice transcription system of the present invention further includes a context identification module 240. The context identification module is coupled to one or more input and recognition components (FIG. 2, 205-230) of the overall speech recognition system 200 and is used to select or create a proper sub-database within the entire specified database 250. If, for example, the desired sub-databases to be used are based on a user context, then the context identification module may take input from a user identification device (not shown) or may determine the user from speech characteristics determined by the speech recognition software so as to select an appropriate user sub-database (e.g. 261) from the entire specified database 250. Alternatively, the data values within the specified database 250 may be loosely organized and the context identification module may actually condition the data values so as to dynamically create an appropriate user sub-database from the information stored within the specified database. As another example, the context identification module may monitor and interpret a particular form field that is active within an application 230 into which text input is to be provided. After making such a determination, the context identification module may select, or as mentioned above, actually condition the data values so as to dynamically create, an appropriate user sub-database from the information stored within the specified database.

Referring again to FIG. 2, the speech recognition/voice transcription system of the present invention may further include a prioritization module 245. As with the context identification module, the prioritization module may be coupled to any one or more input and recognition components (FIG. 2, 205-230) within the overall speech recognition system 200 including the specified database 250. As mentioned above and provided in more detail below, the prioritization module assists in collecting actual use information from the speech recognition system and using that data to dynamically prioritize the data values within any or all of the sub-databases contained within specified database 250.

In one particularly preferred embodiment of the present invention, specified database 250 contains text strings as selectable data values for input into medical forms in a word processing application 230. The text strings may be organized according to a number of different criteria based on the users of the forms and/or the fields within the electronic forms. As shown in FIG. 3, a computer-based electronic medical form 310 shows several fields within a medical report. For example, computerized electronic form 310 may include a name field 315, an address field 318, a phone number field 320, as well as more general fields such as a findings field 330 and an interpretations field 350. One possible organization of the text string data values within specified database 250 is to associate each text string with each field within a particular electronic form. As shown in FIG. 3, text string sub-database 371 may be associated with name field 315, text string sub-database 372 may be associated with address field 318 and text string sub-database 381 may be associated with findings field 330. In this particular example, two separate organizations of the text strings exist within specified, text string sub-databases 371 through 382. For single context fields, the name field 315 for example, sub-database 371 may contain text strings that only indicate patient's names. Likewise, text string sub-database 372 associated with address field 318 of electronic computer form 310 may contain only text strings associated with street addresses.

Figure 4:
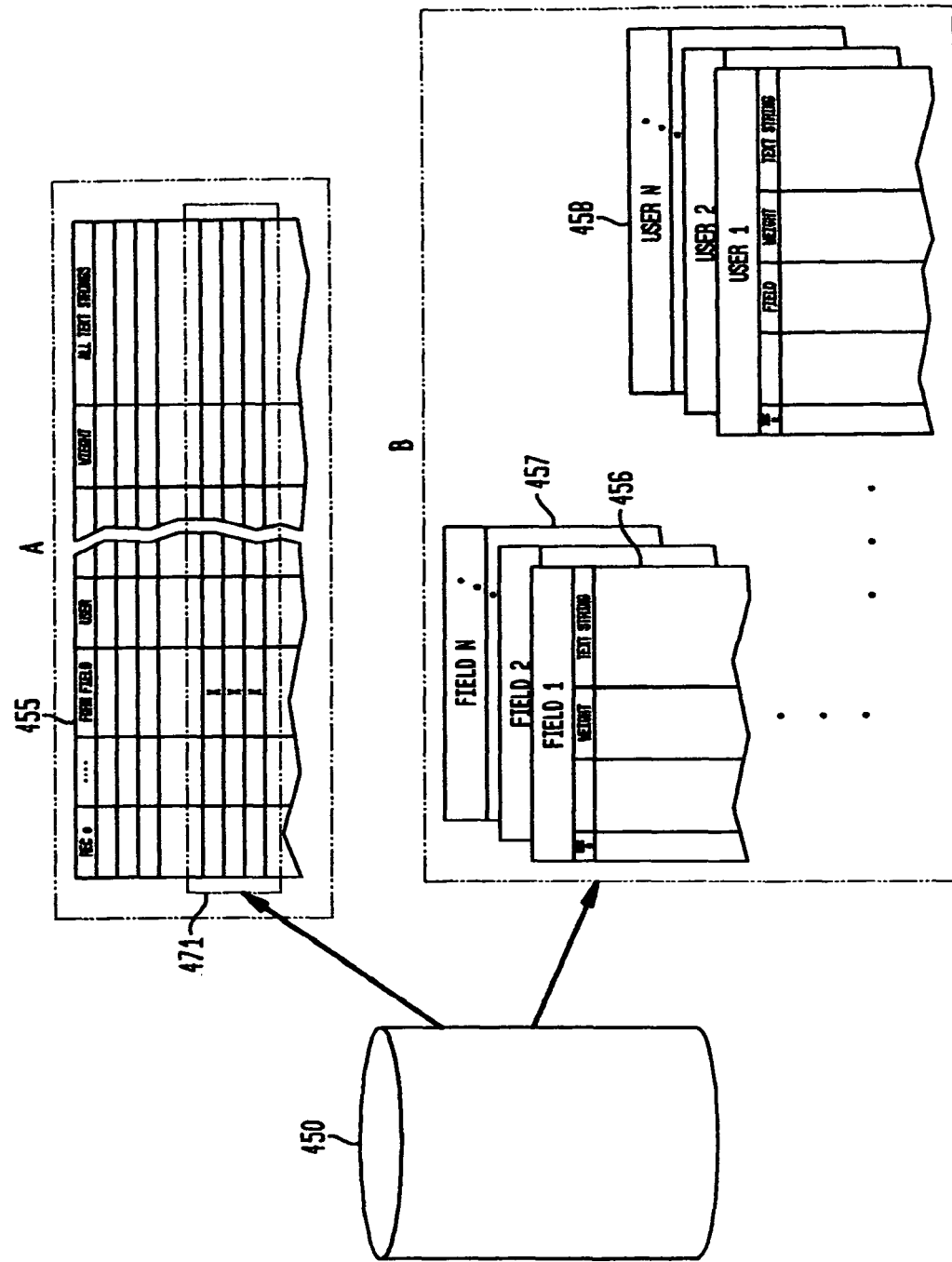
FIG. 4 is a graphical depiction of different text string database organizations according to one embodiment of the present invention.

It should be noted that the data organizations referenced by 261-283 in FIGS. 2 and 371-382 in FIG. 3 are logical organizations only. The data records within specified database 250 may be organized, arranged and interrelated in any one of a number of ways, two of which are shown in FIG. 4. Referring to FIG. 4, the organization of the records within specified database 450 may be loose, i.e. all records may be within one file 455 where each record (and output text string) contains a plethora of relational information. (Option A.) The relational information within the singular file would then, presumably, be able to be used to create the logical divisions shown in FIGS. 2 and 3. One example of a sub-database might be a field context sub-database 471, for example, where the relational data pertaining to the form field within file 455 is used to organize the sub-database. Alternatively, organization of the records within specified database 250 may be tight, i.e. records (and output text strings) may be highly organized according to context/field/user such that a one-to-one relationship exists between a particular file of records (sub-database) and a form field or user, as shown in option B of FIG. 4. While the organization provided in option B may require more computer memory because of the information redundancy needed to create all the discrete sub-databases, this disadvantage in the overall database size 450 may be offset by the advantage of having smaller physical files 456-458 that can be more quickly swapped in and out of computer memory within the speech recognition system. In general, those of skill in the art will realize that different organizations of the same data will provide various advantages and that such data may be organized to optimize any one of number of parameters and/or the overall system operation so as to enhance the advantages of the present invention. Finally, a combination of both database organizations could be used to provide a system that has the advantages of the present invention.

Regardless of the data organization of specified database 250, two types of specified, sub-databases are contemplated by the present invention. The first type may be classified as a singular context sub-database in that one specific criterion provides the motivation for grouping and organizing the records to create the sub-database. One specific embodiment of the specified, this type of sub-database, 371 of FIG. 3, is shown in more detail in FIG. 5, where text string records containing street addresses are stored within sub-database 571 in tabular format. In this particular embodiment, individual records 510, 511 and 512 contain text strings of previously dictated (specified) street addresses which are provided for the purpose of matching a user's speech input when the address field 318 (FIG. 3) is the active dictation field. Other data, such as weighting information 552 and user's data 554, may also be included within text string sub-database 371. With reference to the specific example of FIG. 5, the data records within the sub-database 571 contain text strings and accompanying relational data intended for use only within a specific field within a computerized form or web page. Other specified sub-databases similar to 571 may contain text strings and accompanying relational data that is intended for use with only one of the users of the speech recognition system.

In a second sub-database type, multiple context organizations of the data within specified database 250 are also created. For example, medical form 310 of FIG. 3 may contain input fields that are related to other input fields within the overall electronic form. This interrelationship typically occurs when the voice dictation provided as an input to a field within an electronic form is of a more general nature. In particular, the organization of the text strings within a sub-database may not be based on a single, external, context, such as a specific user of the system or a particular field within an electronic form, but rather may be based on the interrelation of the actual text strings in a more complex manner. As one example, context specific sub-databases 381 (pertaining to the medical findings field) and 382 (pertaining to the medical interpretations field) may include contextually intertwined text strings that the speech recognition system of the present invention must identify and properly select so as to achieve the efficiencies of the present invention. These more complex, contextually intertwined text string sub-databases are shown as logical sub-databases 281-283 in FIG. 2.

A simplified example of the above-mentioned text string interrelation is provided below. As shown in FIG. 3, sub-database 381 provides text strings that may be input into findings field 330 and sub-database 382 provides text strings that may be input into interpretations field 350. However, unlike a field with a limited rage of accepted input within the electronic computer form, the name field 315 for example, sub-database 381 is designed to match text strings to a more general and varied voice input provided to the speech recognition system. FIG. 6 shows one specific embodiment of the specified, text string sub-database 382 of FIG. 3. Sub-database 382 provides text string records related to medical interpretations which are stored within sub-database 682 in tabular format. In this particular embodiment, individual records 615, 616 and 617 contain text strings from previously dictated (specified) interpretations which are provided for the purpose of matching a user's speech input when the interpretations field 350 (FIG. 3) is the active dictation field. Other relational data, such as weighting information 652 and interrelational context information (e.g. age 654, user 656, findings 658) may also be included within text string sub-database 682. In the example of FIG. 6, interpretations text strings, such as pneumonia and dysphagia, are provided as potential text strings to be evaluated against a user's dictation to provide a text input to the interpretations field.

Also shown in FIG. 6 are, two, similar sounding medical terms that have entirely different meanings: dysphagia—a difficulty in swallowing, and dysphasia—an impairment of speech consisting in lack of coordination and failure to arrange words in a proper order. The interpretations sub-database 682 includes both textual inputs as records 616 and 617 respectively. Exemplary interrelational data are also included as data within the text records record of the sub-database. Such data include a patient's history 654, a user of the system 656, the specific findings regarding the patient 658, as well as a general, historical weighting based on the number of times the two term have been used 652. During a dictation into the interpretations field 350 of electronic form 310, table 682 is loaded and consulted to achieve the best possible textual input for dictated speech. If, for example, the phonetically similar word dysphagia/dysphasia is dictated into the system of the present invention then the context interpretation module would evaluate that voice input in view of any one or combination of contextual data. In one case, if the patient's past medical history included digestive complaints then the more probable textual match, dysphagia, may be selected. Similarly, if the patient's past medical history included neurological complaints, the term dysphasia may be selected. Similarly, the context identification module may rely upon other relational data associated with the two text strings to determine the highest probability input. If Dr. Brown is a pediatrician and Dr. Smith is a geriatric physician, then appropriate weight may also be given by the selection system to these previous inputs in determining the proper text input for the interpretations field. Likewise, the input to the findings field 330 may be considered, in which a "difficulty swallowing" would result in a more likely match with dysphagia and "speech impairment" would result in a more likely indication of dysphasia. In addition, other simple weighting factors such as the number of times each term has been used previously may also be used by the system of the present invention to select a more probable input text string. Finally, the system of the present invention may use one, many, or all of the aforementioned contextual relationships to determine and select the proper text input, possibly after assigning additional weighting function to the interrelational data itself, i.e. weighting a user's context higher than the age context.

In operation, a user of the speech recognition system of the present invention inputs speech 205 to microphone 210 for processing by speech recognition system 212. As a stand-alone system, speech recognition system package 212 typically provides a single, general or base vocabulary database 220 that acts as a first and only database. Because of the size of the database and the general nature of the language and the text strings contained within it, voice-to-text transcription accuracies may vary when the speech recognition system is used only with such large, non-specific vocabularies. In medical contexts, for example, inaccuracies in transcription of dictation may result in undesirable or even disastrous consequences. Thus, the inaccuracies generally tolerated by system users must be improved. Greater transcription accuracy, as well as consistency in the dictation within fields of an electronic, computer-based form, for example, may be achieved through the use of multiple databases containing text strings previously used in different contexts. Specifically, through the proper selection of a first—pass database containing a limited but specialized vocabulary and the insertion of this first-pass database into the existing processing used by commercial voice transcription systems, the transcription accuracies of these systems can be markedly improved. Failing a match in the more specific, first-pass database, the speech recognition system can always default to the more general, base vocabulary to provide a textual match for the dictated input.

According to various embodiments of the present invention, the specified database 250 is used by the speech recognition system of the present invention as a first-pass database in selecting an appropriate textual match to the input speech 205. The context identification module 240 is responsible for selecting and loading (or creating) a particular sub-database from specified database 250 during a user's dictation so as to provide a high probability of a "hit" within that sub-database. The selection process employed by context identification module is based on a context of the input speech or a context within the dictation environment Possible contexts include, but are not limited to, a particular user of the speech recognition system, a particular field within an electronic form being processed by the speech recognition system, or the interrelation of previously input text with a sub-database of text that is likely to be dictated based thereon.

Thus, the inherent value of specified database 250 lies in its historical precedent as optionally conditioned with weighting functions that are applied to the text strings within the database. Thus, the creation of a specified database is central to its effective use within the speech recognition system of the present invention.

Specified database 250 may be created in any of a number of manners. In one particularly preferred embodiment past forms may be scanned and digitally input into a computer system such that all the text strings used within those computer forms are digitized, parsed and then stored within the database. The text strings may then be subdivided into specific databases that are applicable to specific speech recognition circumstances. For example, with respect to the example of addresses sub-database shown in FIG. 5, a series of previously recorded paper or electronic medical forms may be parsed, separated and stored such that all the street addresses used on those forms are stored in a separate portion 271 of database 250. Likewise, findings within field 330 and interpretations within field 330 of the electronic form in FIG. 3 may be subdivided from general text string database 250 to create a specific contextual database of diagnoses for use with a particular medical form. As previously described, those of skill in the art will recognize that specified database 250 may be organized in any one of a number of different ways to suit the particular needs of a particular speech recognition application, such as textual input into an electronic form. Such organization may take place statically, i.e. before the user employs the voice transcription system, or dynamically, i.e. during the use of the voice transcription system. In the dynamic context, certain relationships among sub-databases may also be leveraged to provide inputs between computerized form fields.

Figure 7:
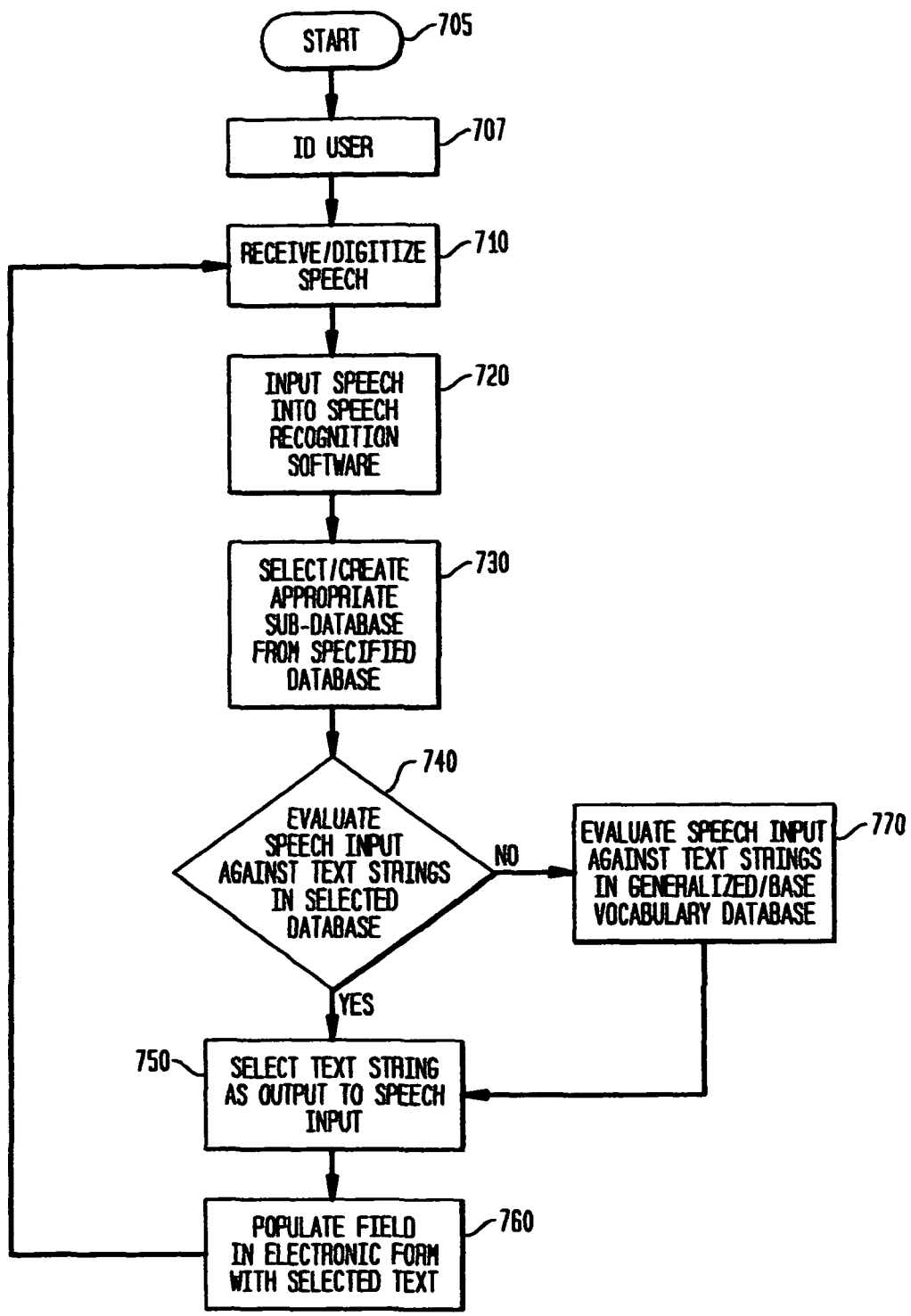
FIG. 7 is a process flow diagram for the speech recognition system according to one embodiment of the present invention.

Referring to FIG. 7, a general process flow is provided for the operation of speech recognition system 200. The process starts with step 705 in which the speech recognition system is loaded and has begun to operate. Specified vocabulary databases may be defined and loaded here for a particular, more global use during the remainder of this process. Next, a user of the system is identified at step 707. As one example, the user may be a particular doctor who wishes to provide speech input to a medical form as part of his practice within a practice group or a medical office. As described above, this user ID may later be used to select appropriate sub-databases and associated text strings from specified database 250. User identification may be done through speech recognition, keyboard entry, fingerprinting or by any means presently known or heretofore developed. Next, voice input from the user is provided to the speech recognition system in step 710. This vocal input is digitized for use within computer system 105 which is then input into the speech recognition system employed on that computer system as shown in step 720.

Next, the context identification module selects or creates an appropriate sub-database consisting of a subset of the text strings within database 250 as the system's operative first-pass database at step 730. As described above, the selection of an appropriate sub-database may occur according to any one or more of a number of different criteria. In one particularly preferred embodiment, the criterion on which the sub-database is selected is based upon the user of the voice transcription system as provided in step 707. Specifically, any particular user may have a historical use of certain words and phrases which may serve as a higher probability first-pass source of text string data for future use by that particular user. Thus, the appropriate selection of that database will result in higher transcription accuracy and use within the speech recognition system.

According to another particularly preferred embodiment of the present invention, the sub-database is selected from the specified database 250 at step 730 according to the field within the electronic form into which text is being input. For example, referring to FIG. 3, when a user wishes to populate address field 318 with a particular address, the user would indicate to the system at step 730 (e.g. through a computer graphical user interface or a vocal command input) that the address field is to be populated. The speech recognition software of the present invention then selects or creates an appropriate sub-database from specified database 250 that contains at least the addresses for use within that form field. The actual data selected and pulled by the context identification module, as mentioned above, would typically include related contextual information that would provide insight into the historical use of particular addresses so as to provide a higher probability in transcription accuracy.

Referring back to FIG. 7, the speech input provided by the user to the speech recognition system at step 720 is evaluated by that system with respect to the text strings within the sub-database selected in step 740. This evaluation may be performed according to the same algorithms and processes used within the speech recognition system 212 which are used to select matching text from its own base vocabulary in database 220. Various methods and mechanisms by which the input speech is parsed and converted to a language output and/or text string output are well-known in the art, and these text matching mechanisms and evaluation criteria are independent of the other aspects of the present invention. Furthermore, other known evaluation criteria may be used on the overall database 250 or the sub-database selected in step 730. Such evaluation methods are well-known, although particular evaluation criteria that are applicable to speech recognition principles may also be employed when populating a field within an electronic form. As an example, the specific text strings of a particular sub-database, such as that shown in FIG. 5 may include a weighting function as shown in field 552 of sub-database 571. The weighting field, for example, may include the number of times a particular address has been input into a form within a specific historical period. Even with this over-simplified weighting scheme, ambiguities as between two very similar addresses may be easily resolved in determining a proper textual match corresponding to a speech input. Other weighting schemes, using both objective indicia (e.g. data use count) and subjective indicia (e.g. weights related to the data itself and its interrelation with other data) are well known in the art and may also be included within specific database 571 for use in the context identification module. Further, other evaluation criteria may be used to select an input text string from the sub-database. For example, a most-recently-used algorithm may be used to select data that may be more pertinent with respect to a particular transcription. Other weighting and evaluation criteria are well-known and those of skill in the art will appreciate different ways to organize and prioritize the data so as to achieve optimal transcription accuracy. Finally, a prioritization module 245 may be included as part of the speech recognition system 200 of the present invention to implement and manage the above-mentioned weighting and prioritization functions.

If the evaluation of the voice input at step 740 results in a match within the selected sub-database of text strings according to the evaluation criterion, then that text string is selected as an output at step 750 and the text string is used to populate the desired field within the electronic form at step 760. Alternatively, if the evaluation criteria is not met at step 740, the speech recognition system within the present invention would default to base vocabulary database 220 at step 770, at which point, the speech recognition software would transcribe the user's voice input in its usual fashion to select a text string output (step 750) according to its own best recognition principles and output the same to the electronic form (step 760).

It should be recognized that the steps provided in FIG. 7 may be repetitively performed in a number of different ways. For example, as one particular electronic form is filled out, sequential fields within that form need to be designated and then populated with an appropriate text string. As such, following the insertion of a particular text string within a particular form field, the process of FIG. 7 may return to step 720 where the user inputs additional speech input after selecting the new field into which the vocal input is to be transcribed. During this second iteration, a second, appropriate sub-database of text strings from specified database 250 would be selected as an appropriate first-pass database for the second field. The process of evaluating and matching the user's vocal input with text strings within the second sub-database, i.e., steps 740 through 770, would operate as mentioned above.

In another operative alternative, a second user may employ the speech recognition system of the present invention in response to which different sub-databases of text strings would to be loaded that pertain to the specific use of that second user at step 730. In this iterative process, a second user would be identified at step 707, after which the speech input provided by that second user would be digitized and processed by the speech recognition system at step 720. The selection and/or creation step 730 may or may not be performed (again) and may be omitted if the only sub-database selection step is conditioned upon a user. The remainder of the process provided in FIG. 7 may then be performed to select an appropriate text string as input into the fields of the electronic form for that second user.

Specific scenarios in which the present invention might be used in a medical office are provided below.

Example #1: A new radiologist joins a group of radiologists who have been using voice recognition technology to dictate reports for about two years. Their practice has a four year old database of digitally recorded imaging studies, linked to a database of the past two years of computer-transcribed reports as well as several years of prior reports manually transcribed to computer by transcriptionists listening to voice recordings. The new radiologist has "trained" the voice engine to recognize his voice as a new user by engaging in a set of radiology voice training exercises that are customized to include phrases commonly used by other members of his group.

If the new radiologists first assignment using the system of the present invention is to dictate a report on a sinus CT scan, the radiologist would identify this report as being for a sinus CT scan and click on the "findings" field at which time the program will load a specified vocabulary for first pass pre-screening composed of text strings that other members of the group have previously used in their dictations as input to the "findings" field for sinus CT scans.

Since the new radiologist is more likely to use terms previously used by his colleagues in dictating reports of previous sinus CT scans than other x-ray related terms that that are phonetically similar, pre-screening the new radiologist's dictation to match text strings previously used by his colleagues, for example, in the "findings" field, will deliver a higher transcription accuracy than the use of a general radiology dictionary or a full English language vocabulary. This is so even if the general radiology vocabulary has been enriched by "Teaming" the preferred terminology and syntax of his colleagues. When the radiologist advances to the "interpretations" field, the virtual vocabulary previously loaded for the "findings" field will be unloaded and replaced by a similarly selected virtual vocabulary for the "interpretations" field.

As the new radiologist uses the system, the prioritization algorithm administered by the prioritization module for his specific user sub-database files may assign relatively higher prioritization scores to his own dictated text strings vis-a-via the dictated text of his colleagues. Over time it will adapt to his personal style, further improving transcription accuracy.

Assume that on his second day of work, the new radiologist is assigned to read studies of the digestive system, and his first two cases are barium swallow studies of the upper gastrointestinal tract. The first case is for the evaluation of a two-month old infant suffering from vomiting, and the second case is a follow-up study for an 87 year-old man with esophageal strictures. While the study is the same, his findings and interpretations in the two cases are likely to be different. Depending on the number of prior reports in his practice group's database, the transcription accuracy of the new radiologist's reports may be maximized by applying more complex prioritization and selection algorithms to the selection of previously-used phrases to be loaded for first pass pre-screening. The weighting of previously used text strings and the selection of those data items as first-pass text strings values for these reports could result in the assignment of multipliers to those data items. These weights could be updated not only each time the first-pass text strings were previously used but also based on the type of study, the age of patient and the diagnoses or symptoms listed as reasons for physician's request in ordered the study. For the above-mentioned infant, weighting factors for text string prioritization and selection could, for example, be based on prior frequency of use in reports of all barium swallow studies in children aged less than 6 months or less than one year. For the 87 year old man, such prioritization could, for example, be based on the frequency of use of those text strings in reporting barium swallow studies in patients in any one or more of the following classes: patients more than age 60/70/80; use of those text strings in reporting barium swallow studies in males in these age ranges; prior use of those text strings in reporting barium swallow studies in patients with a prior diagnosis of esophageal stricture; prior use of those text strings in reporting barium swallow studies of patients with a prior diagnosis of esophageal stricture by age and/or sex; and/or the presence or absence of other symptoms (such as swallowing pain or vomiting). Finally, the weighting factors related to the presence or absence of a symptom, including associated diagnoses (such as status post radiation therapy for a specific type of lung cancer) may be listed in the ordering physician's request for the procedure or may already be present in the database of prior diagnoses for that patient.

There may be an increased likelihood that text strings will be used in a radiology report if they have previously been used in reporting the same type of study or a related study for the same patient (as when high resolution chest tomography is ordered as a follow up to an abnormal chest x-ray). Dictation transcription accuracy may thus be improved by a prioritization algorithm that assigns increased weight to text strings that are previously used in reporting studies with these types of relationship to a study currently being conducted.

The larger the group of users that share common data and voice match text string sources, the greater the extent to which increasingly complex prioritization algorithms can increase transcription accuracy. In certain context driven applications, such as dictations related to the practice of medicine, the greater the linkage of source dictated text to the text strings from which it came, the better the ability to retrospectively analyze prioritization algorithm performance and compare the efficiency of the first-pass vocabulary based on different weighting assignments for different factors in the prioritization algorithm. This makes it possible to create first-pass databases for user in large installations, as they accumulate data with use, thereby allowing complex prioritization algorithms, to be optimized based on their own prior experiences.

Example #2: A physician dictates into either a computerized medical record database or a structured consultation report form as he examines a patient in an office setting. In this scenario, the medical report will usually begin with a listing of the problem(s) for which patient is being seen. These factors, in addition to age and sex, server as effective weighting factors so as to allow the prioritization of previously-used text strings and load the most probable first-pass text strings for each report. Previous diagnoses, if noted in an initial consultation or if already present in the database from previous diagnosis of the same patient, may also be useful as text string weighting factors for sub-database prioritization and selection. If the patient has been previously seen and his or her own previous reports are included in the same database, it may be efficient to assign a first multiplier or weighting factor to every prior text string used in previous reports for that patient and another multiplier or weighting factor for each text string uses in the reports for which each specific diagnosis is listed among the reasons or problems assessed at this visit.

With respect to electronic forms, a computerized medical record has functionally separate data fields. In addition, other types of medical reports have structured sections. Speech recognition transcription accuracy for each such application can be enhanced through the prioritization and selection of first pass, text string databases for each such field on the basis of numerous factors including, but not limited to: the age and sex of the patient problems listed as reason for that patients visit or to be determined during that patients visit; previously recorded diagnoses for that patient; previous use of text strings to be prioritized by that physician in reports for that patient previous use of those text strings with that combination of other selection factors by that physician for other patients; and/or previous use with that combination of other factors by other members of that specialty.

As in Example #1, as each office that uses the present invention accumulates data, it becomes possible to retrospectively analyze prioritization algorithm performance and compare the first-pass hit efficiency of different weighting assignments for different factors in the prioritization algorithm. This allows the initial data record selection scheme to be optimized and permits for a quantitative analysis of the relative efficiency of various prioritization models and weightings for the various offices.

The specific embodiment of the present invention provided above is somewhat idealistic in that it presumes that commercially available speech recognition software provides for dynamically loadable databases and the possibility to hierarchically direct the speech recognition software to sequentially search several such loaded databases, including possibly the general or base vocabulary that the software is programmed to operate with for most other dictations. Unfortunately, none of the speech recognition software packages examined include these general capabilities. Thus, certain improvisations have been made with respect to an existing speech recognition software package in order to practice the advantages of the present invention as described below.

In one particular application, the speech recognition software interfaces with computer operating systems according to an industry standard called the "Speech Application Programming Interface" protocol, abbreviated, "SAPI." SAPI was originally designed for the Microsoft™ Windows operating systems. During the 1990's a similar protocol called SRAPI was developed for non-Windows operating systems but SRAPI lost support in the computer industry and current versions of SAPI have been applied to non-Windows as well as Windows operating systems.

SAPI (and, in its day, SRAPI) provide for computer-based responses to three types of speech input application defined commands, user-defined commands (both referred to hereinafter as "commands") and general dictation of vocabulary. A signal representing an incoming item of speech is first screened by the program to see if it represents a command, such as, "New paragraph," and, if so, executes it as such. Within speech recognition applications such as a word processor, this command may cause the insertion of a paragraph break, a new-line feed and an indent so as to permit the continued dictation in a new paragraph. Incoming speech items that are not recognized as commands are transcribed as general vocabulary text, in which the speech recognition software looks for the best possible match for the dictated text within combinations of single word text strings loaded into the general vocabulary database of the application.

Current versions of the SAPI protocol and current voice engines only accommodate the loading of one vocabulary at a time. However, they accept rapid loading and unloading of smaller sets of user-defined commands. These smaller sets may be as large as the relatively small, first-pass vocabularies needed to optimize speech recognition accuracy for dictation into a computer field. The invention of the present invention encompasses methods to identify, prioritize and select the high probability text strings which would optimize transcription accuracy if used as a first pass pre-screening vocabulary. These text strings may then be translated into user-defined commands which are loaded and screened for matches as a first pass "virtual vocabulary." In this manner, the existing speech recognition systems have been tricked into implementing a two-pass vocabulary screening model as described above under present SAPI protocols and with presently available voice engines. Incorporation of the methods and apparatus of the present invention would be made more user-friendly by incorporating the entirety of this invention into future versions of SAPI and into applications compliant with such future versions of SAPI.

Figure 8:
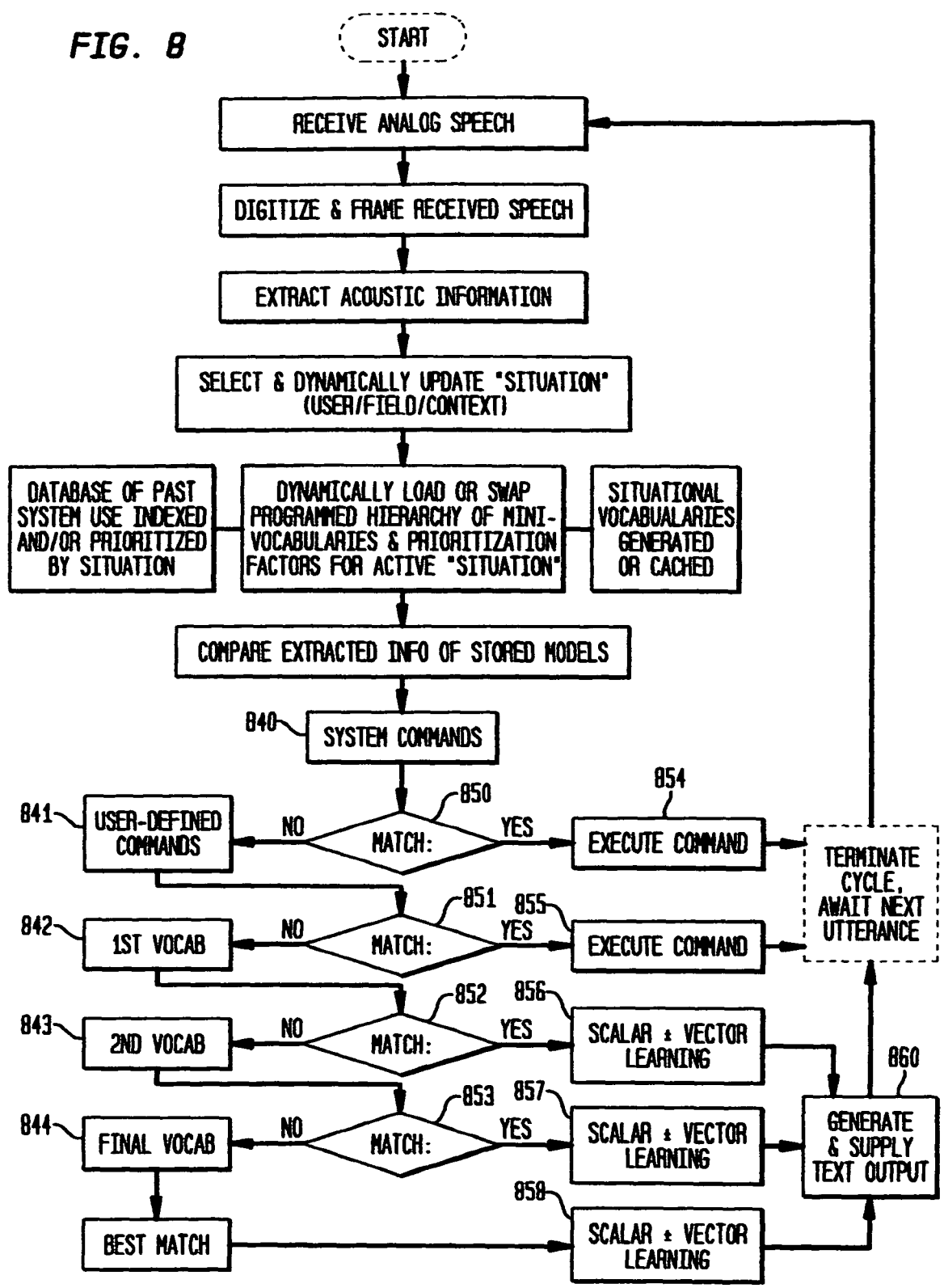
FIG. 8 is another process flow diagram for the speech recognition system according to another embodiment of the present invention.

Referring to FIG. 8, a general process flow for the operation of the speech recognition system 200 is provided as it would be implemented within a specific SAPI speech recognition engine. In general, the steps are substantially similar to those provided in FIG. 7 with the following modifications. At step 740, Instead of evaluating the speech input against a set of text strings in the selected/created database, the process of FIG. 8 sequentially evaluates the speech input first, against the database of system commands 840, and then, if necessary, against the database of user-defined commands 841, and then, if necessary, against the database of a first vocabulary 842, and then, if necessary, against the database of a second vocabulary 842, and finally, if necessary, against a final database 844. If a match is determined during any one of these evaluations (steps 850-853), then either the "command" is executed (steps 854-855) or a learning function is exercised (steps 856-858), and the executed command or selected text from a database results in the generation and insertion of the selected text string into a computer form field (step 860).

With specific application to Example #1 provided above, the method of the present invention provided in the flow diagram of FIG. 7 and may be modified to operation more efficiently by including some of the elements of the process shown in FIG. 8. For each context of user (radiologist), type of imaging study (as chest x-ray or sinus CT), patient demographics (including age, sex, past medical history, reason for this study) and field of report, first pass vocabulary 842 may be provided which includes previous dictations by the same user when all the other variables were identical. The second pass vocabulary 843 may be provided which includes dictations by other members of the radiology group when all other variables were the same as those of the present report. The third pass vocabulary 844 may be provided which includes other dictations by the present radiologist into the same field for the same type of study but for patients with all combinations of age, sex, past medical history and reason for study. Thus a multiple pass series of specific context dependant sub-databases may be provided in actual application before the base vocabulary of the speech recognition software is employed to provide a match.

In operation and as described in the above-mentioned application, known transcription methods include vector learning in which the speech engine alters the way it maps incoming utterances into the vector space. If, for example, a native Bostonian speaker of English used the speech recognition system, a "translation" of sorts is needed for the speech engine to process the user's incoming speech so that the appropriate vocabulary is matched with the speaker's utterances. This is typically handled by speech engines through a training process in which the user reads for several minutes from text for which the vector mapping sequence is already known to the system, and the program develops an array of user-specific vector corrections to optimize the match between the vector sequence of the user's pattern of utterances and the vector sequence of the text he's reading. Through this "training process" the speech engine may adjust for a speaker's accent and/or other speaker-specific or speaker-associated variations from "typical" patterns of pronunciation. Although vector learning will affect the overall recognition accuracy of a speech recognition application, it is perfectly compatible with the teachings of the present invention which may be used in conjunction to select the user's intended word from a group of vocabulary returned by the speech engine.

In operation and as described in the above-mentioned application, known transcription methods include scalar learning which involves the weighting of different vocabulary items based on prior use. Scalar learning, in essence, makes one vocabulary element in the vector space brighter or dimmer than an average based on the frequency of past use, say for example, by a particular user of the system. Thus, the probability of matching a user's input in vector space becomes a function of both the speech engine's provided probability of matching a user's input based on the actual input received and the frequency of use of other, less frequently used vocabulary elements. Thus it is envisioned that developers of a speech engine may begin with large vocabularies that may have default weightings of certain vocabulary elements based on frequency of use in general speech which are then further modified by the frequency of use by each (or a particular) individual user.

The goal of speech recognition software is to minimize the frequency of transcription errors, errors will occur, particularly as the system "learns" the dictation habits of new users, new form fields and vocabulary contexts any of which include new vocabulary elements. In many dictation transcription speech recognition applications, dictation errors, in which the user utters the wrong word, and transcription errors, in which the speech recognition system misidentifies what was said, are not likely to be recognized and corrected until some time after the dictation is completed, often on the order of hours and typically up to days, after the dictation has been completed. Because scalar learning is based on the frequency with which various text elements have been used in the past (i.e., accepted as accurate transcriptions), accurate scalar learning requires that feedback be included. This typically takes the form of post dictation, "off-line" correction of dictation and transcription errors to the vocabulary data elements that were erroneously selected. There are a number of technologies that do this in speech engines that operate with single vocabularies. In particular, any of these technologies may be used for the large, non-specific vocabularies, such as those typically provided as the last vocabulary pass according to the method of the present invention. The present invention makes simpler strategies possible, however, for the situation-specific vocabularies as described briefly below.

As with any transcription and dictation system, the designers of applications using them are most likely forced to choose between either 1) a gold standard of scalar learning or weighting in situational vocabularies based on what was intended or what was determined to be correctly intended to have been said, in which case the speech engine should reflect the correction of both dictation and transcription errors, or 2) a gold standard based on what was determined to have actually been said, in which case the speech engine should reflect the correction of transcription errors but not dictation errors. Further, compromises and accommodations may be needed depending on how data is stored, particularly if it is locked as is required in many medical record applications.

In one particularly preferred embodiment of the enhanced invention, the specific vocabularies of the present invention consist of searchable text entered in a date and time-stamped manner into forms and fields identifiable by user and context. Off-line error correction is performed by amending text directly in the fields into which it was dictated in the database so that new scans and word use counts of those fields will incorporate these corrections to generate situation-specific vocabularies for future use. Further, text amendments may be made directly to the database when it is open or unlocked for correction. In one preferred implementation of the present invention, it is envisioned that the scalar learning will be based on text that incorporates correction of both dictation and transcription errors, as opposed to attempting to account for categorize and record the nature of the dictation errors as between dictation corrections or transcription corrections.

In several envisioned applications of the present invention, such as electronic medical records, the input data from the speech engine is locked when it is signed. In this case, it may not be practical to include corrections made to records after they have been locked in the subsequent vocabulary and the vocabulary element weighting scheme may depend on how data is stored. Most programs that require data locking still allow subsequent error correction and annotation, although they often require that a copy of the original dictation be retained along with a record of the user making the changes and time stamp indicating the time of the changes. If this is done in a way that leaves the amended record in the original database, presumably in which the original dictation and audit trail data are store elsewhere, it is advantageous to work directly with the amended data which can be appropriately weighted and used to populate the database. Alternatively, if the original record remains in the database and amendments to the speech input are made after that data is locked and stored elsewhere in the system, it may be advantageous to base scalar learning (i.e., weighting) on a scan of the database, although in this case it will not include correction of either dictation or transcription errors that were found and corrected after the record was signed and locked.

The user will generally be known to the system. If database entries are appropriately indexed or tagged using standard methods, when a registered user loads a specific form and enters a specific field of this form, the system can quickly compile the programmed hierarchy of vocabularies to be matched with incoming speech in that field of that form, and, for applications which also sort data by previously entered indicators of context. Example: Radiology transcription installation in which name of patient, demographic data including age and sex, the x-ray or other imaging study being reported and relevant clinical history including the reason for the procedure have already been entered: each one of these data items and every combination constitutes a context defining a set of past records from which content can be pulled for the smallest, highest match likelihood vocabularies. If the radiologist mentions the word, "fracture" in the "findings" field, this term can be used further define the context and guide vocabulary selection for the "discussion" or "interpretations" field.

According to an enhancement to the present invention the incoming speech from a user is compared with the hierarchical sequence of vocabularies moving from the most specific to the most general. With respect to the sequential vocabularies themselves, they may be ordered according to any one of a number of criteria to match a particular need. By way of example, the vocabularies may be created and provided in an order of frequency of use, say for user, each vocabulary containing frequently used vocabulary elements of a particular user. Again, by way of example, vocabularies which are used to provide an input to a particular form field may be created and ordered in terms of the relative frequency of input of various terms historically input to that form field. Also by way of example, the vocabularies may be created and ordered in terms of the relative frequency of use of terms according to a particular context of speech use (e.g. medicine or law). Combinations and permutations of these factors may also be used to create and order vocabularies from appropriate vocabulary elements so as to achieve appropriate speech engine matching results in any particular circumstance. In a particularly preferred embodiment, the first vocabulary contains terms from the same user, into the same field for the same context. Subsequently screened, less-specific vocabularies may contain vocabularies from the same user for the same context in any field.

As a specific example of sequential vocabulary ordering, the vocabularies of the present invention may be organized according to the following (doctor specific example):

1. Vocabulary to consist of all prior dictations in that medical record system by the same physician, for the same field of same medical record form for the same patient with the reason for visit field including the same problem or complaint
2. Vocabulary to consist of all prior dictations in that medical record system by the same physician, for the same field of same medical record form for the same patient but for all encounters regardless of what was entered in the fields for "reason for visit," "currently active problems," or "presenting complaint."
3. Vocabulary to consist of all prior dictations in that medical record system by the same physician for the same field of the same medical record form for demographically similar patients (same range of age, sex, same prior diagnoses relating to the body system covered by that field of that medical record form).
4. Same except for all patients regardless of demographic similarity.
5. Vocabulary including prior dictations in that medical record system by all physicians using that system for the same field of the same medical record form for that patient.
6. Vocabulary including prior dictations in that medical record system by all physicians for that field of that form for demographically similar patients.

In operation, and in contrast to the sequential match or no match decision on a vocabulary-by-vocabulary basis previously described, the enhanced invention saves the best matches based on a match probability score returned by the speech engine from each sequentially searched vocabulary. This set of best matches from the first (and generally most situation-specific) vocabulary of the hierarchy is then combined with a set of best matches from the next sequential vocabulary to be tested in the hierarchy, with the assignment of increased match likelihood weight to those from the first vocabulary to reflect the greater situation specificity of that vocabulary. This process may be repeated so that all vocabularies in the hierarchy are searched and each saved element is assigned an increased selection weight each time it survives the transition from the set of best matches at the end of one cycle of the process to the set of best matches at the end of the next cycle. The speech engine then chooses its best match as it would in the absence of this invention, except that with the invention the selection likelihood of each term surviving from earlier, more-situation-specific vocabularies is increased in correlation with the situation specificity of the vocabulary in which it first appeared.

Alternatively, and possibly in order to keep the speech engine selection process manageable, each subset of combined set of vocabulary elements may be reduced in size according to the weighted matched probability scores (say to keep it to "n" entries) as the sequence of vocabularies are processed so that the combined set of vocabulary elements does not grow beyond a manageable size during the process.

Figure 9:
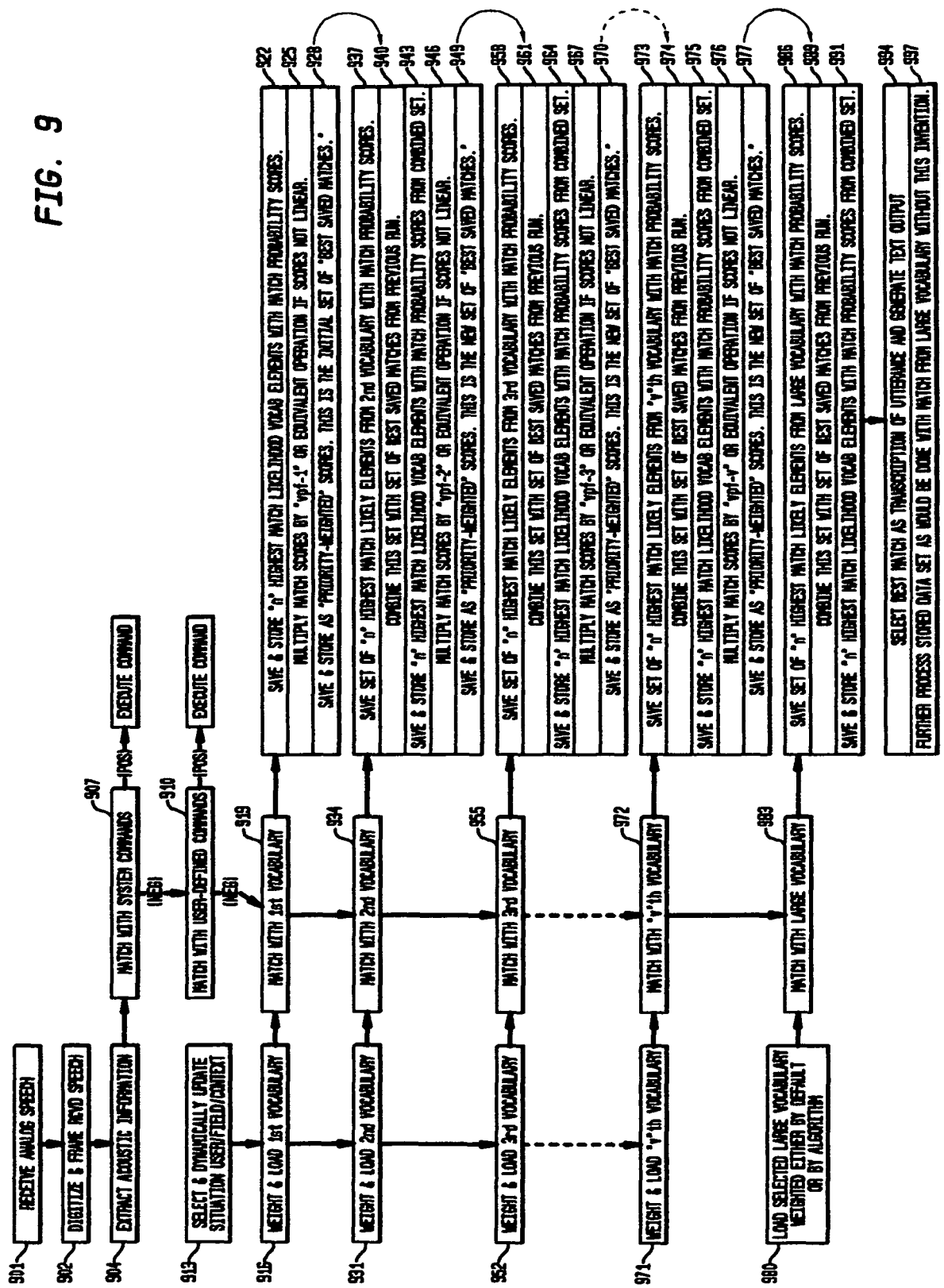
FIG. 9 is another process flow diagram for the speech recognition system according to another embodiment of the present invention.

Referring now to the process provided in FIG. 9, incoming analog speech is received (901) digitized and framed (902), and acoustic information for vector mapping is extracted (904). As an example, and not necessarily a necessary component of the enhanced invention, the acoustic information is sequentially matched with system commands (907) and user-defined commands (910) to determine an input match. It is envisioned that in some speech processing systems the user has the option to determine whether an utterance will be exclusively treated as a command (for example, in some systems by pressing the keyboard <ctrl> key during dictation), in which case the speech processing system may only matches (907) and (910), or as speech (for example, in the same systems by pressing the keyboard <shift> key during dictation), in which case the speech processing system bypasses matches (907) and (910) and begins with speech vocabulary match step (919). If an incoming utterance is not matched with a system or user-defined command (steps 907 and 910) or if the user bypasses these steps by marking the utterance as text, the enhanced invention of the present invention includes the following sequence of events.

Preliminary to the operation of the enhanced method, the sequential vocabularies to be used may be selected and dynamically updated (913) according to any one or more of the criteria mentioned above, e.g. user, form field, or context. After establishing the proper sequential vocabularies, the first vocabulary is selected and loaded (916) with each entry weighted according to an algorithm based on factors which may include but are not limited to user, prior use in that combination of form, field & context, and time elapsed since each prior use. The speech engine then matches the contents of the first vocabulary with the incoming utterance not according to the language rules of the particular search engine and match probability scoring procedure used by that speech engine (919). "N" potential matches are then identified using highest match probability scores and saved, along with their scores, in a designated array of data registers within the speech processing engine (922). Each saved match probability score is then weighted by a "vocabulary priority factor" "vpf-1." By weighting, a simple multiplication function may be used by the speech engine, particularly if the match probability scores are numbered on a linear scale. In any case, a weighting function is used to increase the match probability score for the "n" initially selected vocabulary elements from the first vocabulary (925). These "n" best match candidates with weighted match probability scores are then stored (926).

The second vocabulary is then loaded, possibly having each vocabulary entry weighted according to an algorithm based on the above-mentioned factors (931). The speech engine then matches the contents of the second vocabulary with the incoming utterance not according to the language rules of the particular search engine and match probability scoring procedure used by that speech engine (934). "N" potential matches are then identified using highest match probability scores and saved, along with their scores, in a designated array of data registers within the speech processing engine (937). These "n" potential matches are then combined with the "n" weighted matches from the first evaluation (940) so as to create a combined set of vocabulary elements. Each of the saved match probability scores of the vocabulary elements within the combined set of vocabulary elements is then weighted by a second "vocabulary priority factor" "vpf-2" (946). By weighting, a simple multiplication function may be used by the speech engine, particularly if the match probability scores are numbered on a linear scale. In any case, a weighting function is used to increase the match probability score for each element of the new combined vocabulary that will be pooled with the best selections from another, still less situation-specific vocabulary in the next cycle (946). These best match candidates with weighted match probability scores are then stored (949).

As an alternative to the procedure in which all weighted "n" results from the first vocabulary and the "n" vocabulary elements from the second vocabulary are combined and weighed by the second "vocabulary priority factor" "vpf-2" the set of vocabulary elements for matching and storage may be maintained at a particular or constant size (e.g. "n") so as not to grow the set of combined vocabulary elements to a computationally unwieldy number of elements.

The method of the enhanced speech recognition system continues, iteratively, until the v-th vocabulary is loaded, possibly having each vocabulary entry weighted according to an algorithm based on the above-mentioned factors (971). The speech engine then matches the contents of the v-th vocabulary with the incoming utterance according to the language rules of the particular search engine and match probability scoring procedure used by that speech engine (972). "N" potential matches are then identified using highest match probability scores and saved, along with their scores, in a designated array of data registers within the speech processing engine (973). These are potential matches are then combined (970 dashed line to 974) with the "n" weighted matches from the previous evaluation (974) so as to create a combined set of vocabulary elements. Each of the saved match probability scores of the vocabulary elements within the combined set of vocabulary elements is then weighted by a v-th "vocabulary priority factor" "vpf-v" (976). By weighting, a simple multiplication function may be used by the speech engine, particularly if the match probability scores are numbered on a linear scale. In any case, a weighting function is used to increase the match probability score for the "n" initially selected vocabulary elements from the v-th vocabulary (976). These best match candidates with weighted match probability scores are then stored (977).

As an additional, optional step, a final, large (e.g. all encompassing global) vocabulary is loaded, possibly having each vocabulary entry weighted according to an algorithm based on the above-mentioned factors (980). The speech engine then matches the contents of the large vocabulary with the incoming utterance according to the language rules of the particular search engine and match probability scoring procedure used by that speech engine (983). "N" potential matches are then identified using highest match probability scores and saved, along with their scores, in a designated array of data registers within the speech processing engine (986). These "n" potential matches are then combined (977) with the "n" weighted matches from the previous evaluation (989) so as to create a combined set of vocabulary elements. If desirable, each of the saved match probability scores of the vocabulary elements within the combined set of vocabulary elements is then weighted by a final large "vocabulary priority factor" "vpf-I" (not shown). These best match candidates with weighted match probability scores are then stored (991).

As a final step, the speech engine selects a best match for the user input to the speech recognition system a vocabulary element from the combined set of vocabulary elements based on said repeatedly weighted match probability scores so as to result in a final match for the user input (994). The final match is then stored for further retrieval by the speech engine. In the unlikely event that that user designates the best selected match as an error, the other next closest sequential matches may also be stored for presentation and selection by the user as potential matches to the user's input. In this event, a flagging system may be included so that the user may designate the particular input and initially selected match as an error for future dictation correction.

Figure 10:
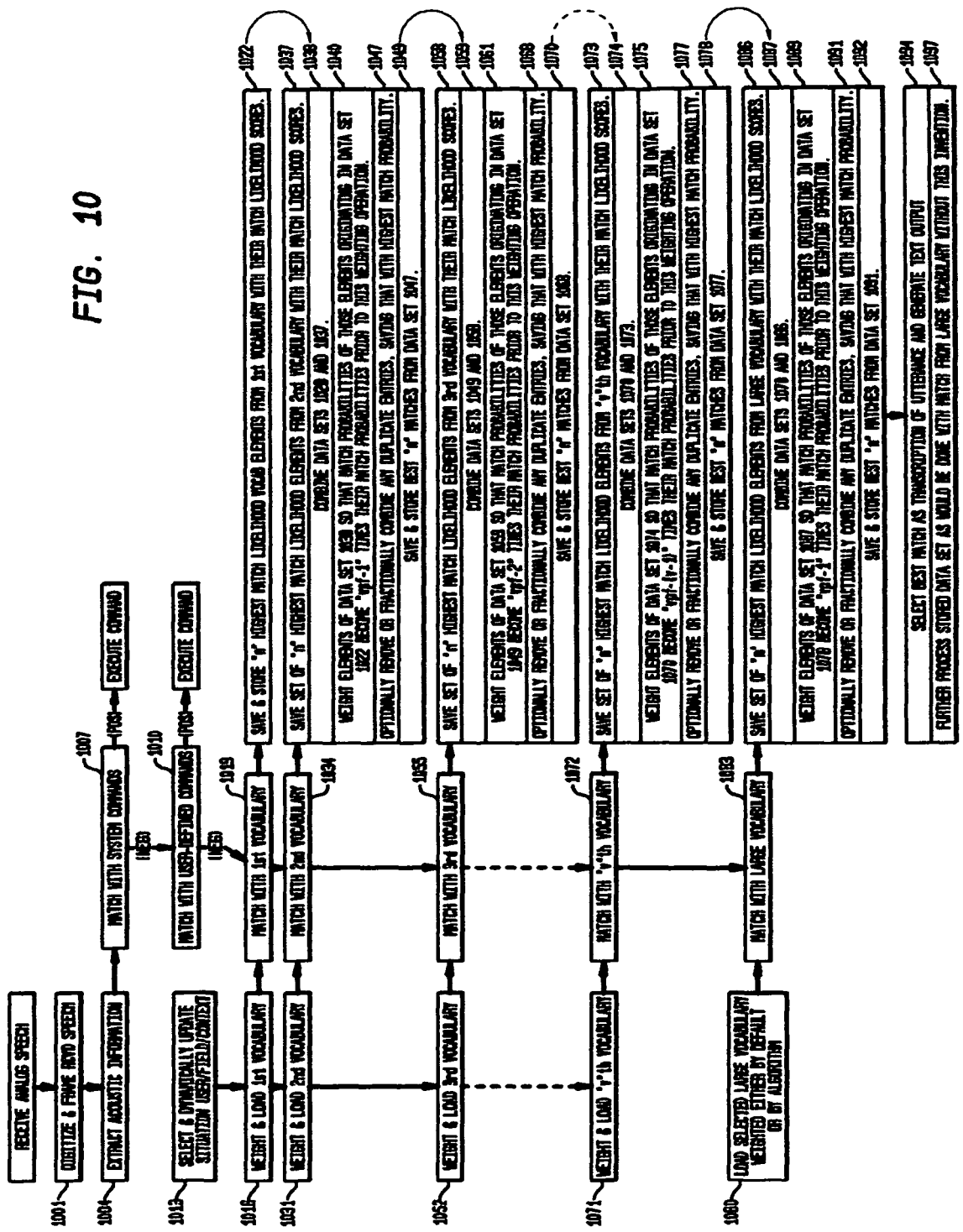
FIG. 10 is another process flow diagram for the speech recognition system according to another embodiment of the present invention.

Referring now to the process provided in FIG. 10, several key differences are provided from the process provided in connection with FIG. 9 where non-linear weighting is involved. In particular, when non-linear weighting is involved, it may be critical to first combine the "n" best vocabulary elements from the currently selected vocabulary with the weighted vocabulary elements from the previously evaluated vocabulary prior to the application of the weighting function. Specifically, steps 1038 and 1040 as shown with respect to the second vocabulary of FIG. 10. As an example of the complication with non-linear weighting functions, the table below shows the calculations necessary to evaluate one example of a non-linear weighting function.

In particular, assume that a particular search engine assigns a match score "s" to each vocabulary element that passes the initial screening as shown and provided in column 1 in table 1 below this is subtracted from the original total of 263 to give a distributed sum of 125.5 to be allocated in appropriate proportion over the three vocabulary elements of vocabulary 2. When doing so, the three approximate target values of 21.82, 35.47 and 68.20 are shown to result in column 6 for those elements.

Now, as a final calculation to arrive at "u" values which the speech engine can employ, the quadratic equation is used to calculate and derive the modified first and the modified second match probability scores for the vocabulary elements of the first and second vocabularies. The positive roots of the

TABLE 1

| Row Index | 0 | 1 | 2 | 3 | 4 | 5 | 6 |
|---|---|---|---|---|---|---|---|
| 1 | | | | | | | |
| 2 | From vocab | s | r | sum of r | p = r/sum of r | q = P * 1.1 | t = r * 1.1 |
| 3 | 1 | 1 | 11 | 263 | 0.041825095 | 0.046007605 | 12.1 |
| 4 | 1 | 3 | 39 | 263 | 0.148288973 | 0.163117871 | 42.9 |
| 5 | 1 | 5 | 75 | 263 | 0.285171103 | 0.313688213 | 82.5 |
| 6 | | | | | | | 137.5 |
| 7 | | | | | | | t |
| 8 | 2 | 2 | 24 | 263 | 0.091254753 | 0.082988924 | 21.82608696 |
| 9 | 2 | 3 | 39 | 263 | 0.148288973 | 0.134857001 | 35.4673913 |
| 10 | 2 | 5 | 75 | 263 | 0.285171103 | 0.259340387 | 68.20652174 |
| 11 | | | 263 | | 1 | 1 | |
| 12 | | | −137.5 | | | | |
| 13 | | | 125.5 | | | | |
| 14 | | | | | | | |
| 15 | | | | | | | |
| 16 | | | 24 | | | | |
| 17 | | | 39 | | | | |
| 18 | | | 75 | | | | |
| 19 | | | 138 | | | | |
| 20 | | | 0.90942029 | | | | |

| Row Index | 7 | 8 | 9 | 10 | 11 | 12 | 13 | 14 |
|---|---|---|---|---|---|---|---|---|
| 1 | | | | | | u1 | u2 | |
| 2 | a | b | c | z = b ** 2−4ac | sqrt(z) | (−b + sqrt(z))/2a | (−b − sqrt(z))/2a | u1/s |
| 3 | 1 | 10 | −12.1 | 148.4 | 12.18195387 | 1.090976933 | −11.09097693 | 1.090976933 |
| 4 | 1 | 10 | −42.9 | 271.6 | 16.48029126 | 3.24014563 | −13.24014563 | 1.080048543 |
| 5 | 1 | 10 | −82.5 | 430 | 20.73644135 | 5.368220677 | −15.36822068 | 1.073644135 |
| 6 | | | | | | | | |
| 7 | | | | | | | | |
| 8 | 1 | 10 | −21.82608696 | 187.3043478 | 13.68591787 | 1.842958933 | −11.84295893 | 0.921479466 |
| 9 | 1 | 10 | −35.4673913 | 241.8695652 | 15.55215629 | 2.776078144 | −12.77607814 | 0.925359381 |
| 10 | 1 | 10 | −68.20652174 | 372.826087 | 19.30870495 | 4.654352476 | −14.65435248 | 0.930870495 |

Figure 11:
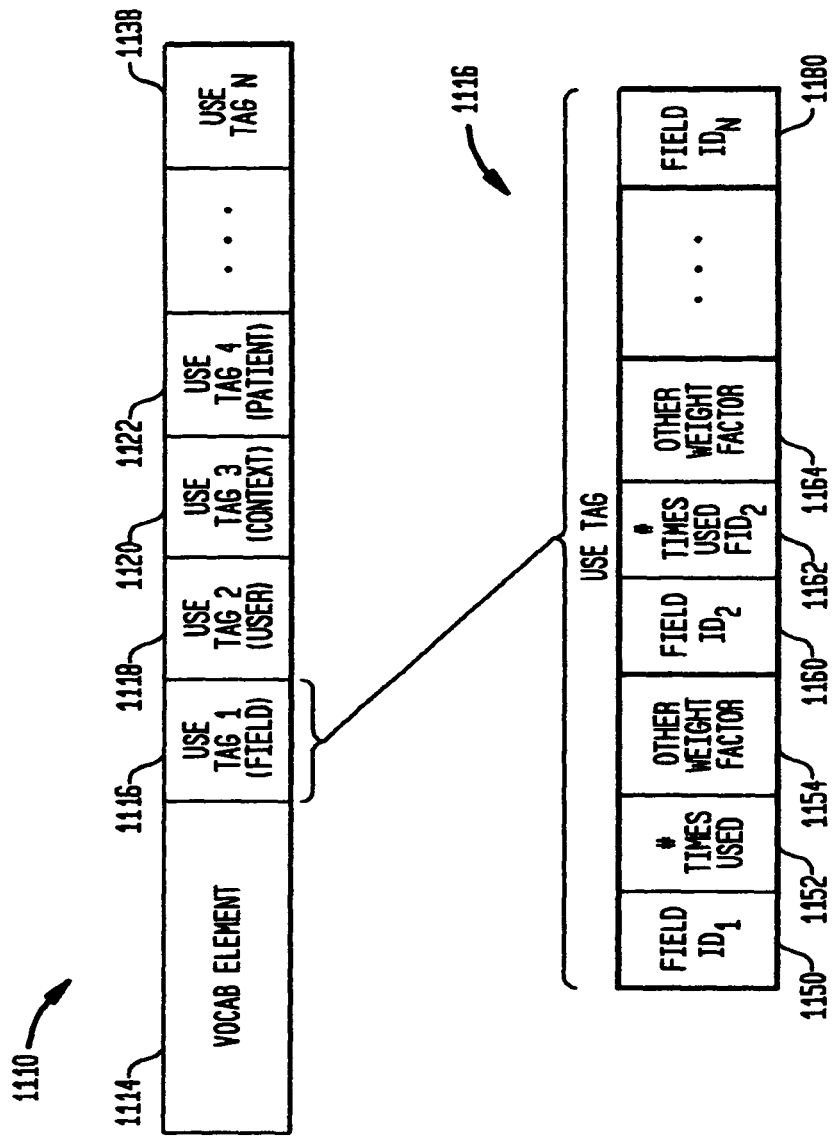
FIG. 11 is an exemplary vocabulary element data record according to another embodiment of the present invention.

For the first pass vocabulary (shown as 1 in column 0), the respective match probability scores for the three selected vocabulary elements are 1, 3 and 5 and for the second pass vocabulary the respective match probability scores for the three selected vocabulary elements are shown as 2, 3 and 5. Assume that the non-linear weighting function is a simple exponential function of the form r=s2+10 s and that the calculated values for r are provided for vocabulary 1 as provided in column 2 of table 1. Now by calculation of the sum of all the weighed probabilities is 263 which, when shown as a fractional representation of the numerical probability of each of the six vocabulary elements, the sum of which is one, is provided in column 4. Now assume that the first vocabulary prioritization factor is 1.1; the preliminary values for the weighted, first three vocabulary elements are shown as the first three values in column 6 of FIG. 11. The problem at hand, now, is to calculate the same respective weighted values for the for the three vocabulary elements of the second vocabulary such that the total sum of the probability of the search engine choosing one of the values is still equal to one. Thus, looking at the total of the weighted first three vocabulary elements from the first vocabulary (137.5**)

quadratic equation, given the values of a, b and c provided in columns 7, 8 and 9 respectively, are shown in column 12 as the final, exponentially weighted match probability scores for the six vocabulary elements in the table of FIG. 11. Further, the non-linear, non-constant effective multiplicative value for each of the individual vocabulary elements is shown in column 14. In sum, the non-linear weighting has required that the vocabulary elements of the two respective vocabulary match sets be combined prior to the derivation of the effective multiplicative factor that would provide the same weighted value as shown, by way of example, in steps 1038 and 1040 of FIG. 10 for the second vocabulary match.

According to the present technologies available with existing commercial speech engines, very little modification of the speech engine's potential match results is permitted by those engines in response to dictated input. In particular, the default vocabulary element databases within the existing commercial speech recognition systems are predefined in term of content, and the only ability to enhance the database contents is provided through certain importation functions which permit external vocabulary elements to be imported and combined with the default vocabulary elements of the speech engine database. Further, each presently available commercial speech recognition systems provides its own default weightings and prioritization to the resultant vocabulary element match sets as provided by the speech engine in response to speech input. As the use of the speech engine technologies extends into more mainstream applications, it may become desirable to modify the search results provided by the commercial speech engine based on a particular use context or records database with which the speech engine is being used. Specifically, it may come to be realized that the continuous swapping of vocabularies in and out of memory and appropriate integration with the speech engine may become computationally difficult or simply inefficient. To account for this, without causing significant disruption of the operation of existing commercial speech engines, a virtual vocabulary that is specific to a particular context or records database may be created on the outside of the speech engine. This virtual vocabulary may be tightly coupled to the particular context of the records database such that the virtual vocabulary acts as a surrogate for providing minimally intrusive modifications to the search results returned by the speech engine. Such modifications would be provided in an effort to increase the efficiency of the speech engine's returned search results as specifically tailored to accommodate a particular context or a particular records database.

According to one particularly preferred aspect of this embodiment, a records database is used as the target for the speech engine's search results and the interface to the records database is a form field input screen in which a number of fields are provided for text input. The user of the records database may provide such input by either typing in the desired textual data or by dictating such data into speech recognition system that attempts to transcribe the dictated input into the most appropriate text for input into the form field. A medical records database and associated input system is an exemplary use of such a database record system. In this context, the vocabulary elements of the records database may contain specific medical terminology that may not be a part of the speech engine's default vocabulary. While this text may be easily imported into the speech engine's default vocabulary element database, proper selection of the most appropriate input to any form field in response to dictated input may be enhanced by taking into account database input criteria that is not typically evaluated by the speech engine during the generation of a potential match results list. By way of specific example, the adjunct criteria may include criteria that the speech recognition systems do not use as part of its default selection criteria. Such criteria may include identification of the electronic form field in which the vocabulary element has previously been used, the subject or patient with reference to which the dictation is being performed, and/or the doctor providing the dictation input.

Referring now to FIG. 11, an exemplary data record 1110 for one vocabulary element of the virtual vocabulary database is provided. The virtual data record includes a vocabulary element 1114 which is compatible with and specific to a particular speech engine. In practice, the vocabulary elements used by speech engines typically consist of a speech phoneme or string of phonemes based on a particular file format understandable by and used by the speech engine. One well known example of a collection of such vocabulary elements to create a grammar file is the Bakus-Naur Form (BNF) which describes the structure of the language spoken by the user. Such grammar file representations are well known in the art and are not discussed in detail herein. In alternative embodiments, other grammar file formats and structures may be used and the present invention may be applied to and used with any such vocabulary element. For the ease of illustration and discussion only, however, the vocabulary element of FIG. 11 is discussed below as if it consists of a text word upon which an exact linguistic textual match is being performed, although it should be recognized that this is most likely not the actual electronic representation and matching exercise that typical commercial speech engines employ to perform such matching. Further, according to a preferred method of virtual vocabulary database creation, discussed below, the preferred vocabulary element embodiment is a computer text element that is derived form actual input from a records database.

According to one particularly preferred embodiment of the present invention, a plurality of historical use tags, 1116, 1118, 1120, 1122, and 1138 may be provided according to different criteria associated with vocabulary element 1114. Use tags may consist of computerized bits and bytes that identify a previous form field in which the vocabulary element has been used 1116, a previous user of the speech engine 1118, a previous context in which the vocabulary element has been used 1120, or a previous patient with which the vocabulary element has been used. Those of skill in the art will realize any number of the plurality of different criteria upon which speech engine matching may be performed and the criteria provided above and in FIG. 11 are given by way of example only.

Drilling down into the data structure of each use tag, each tag preferably includes information representing a weighting for each of the numerous elements of the specific criteria associated with the particular tag. In the example provided in FIG. 11, use tag 1116 is shown expanded in its database representation to include data pertaining to each electronic form in which the vocabulary element has been used, e.g. Field ID 1, 1150, Field ID 2, 1160, to field ID N, 1180. Associated with Filed ID 1, is the number of times the associated vocabulary element has been used in that field 1152 and optionally other relevant weighting criteria used by the adjunct vocabulary database and/or speech engine 1154. Those of skill in the art will realized that the representation of the tag data within the adjunct vocabulary database may be accomplished by any of numerous different representations, and further, that the tag data itself may grow to be prohibitively voluminous in view of the size of the data needed to represent the vocabulary element itself. Thus, and as discussed more below, different data representations and organizations of the data within the adjunct vocabulary database may be used to implement the teachings of the present invention so as to optimize data storage sizes, data searching efficiency and any other database optimization criteria. In particular, Speech Application Language Tags as provided by the Speech Application Language Tags (SALT) Forum, which has published a SALT 1.0 specification the entire contents of which are incorporated herein by reference, is another exemplary method of implementing the use tagging and which may be used according to the method of the present invention.

Figure 12:
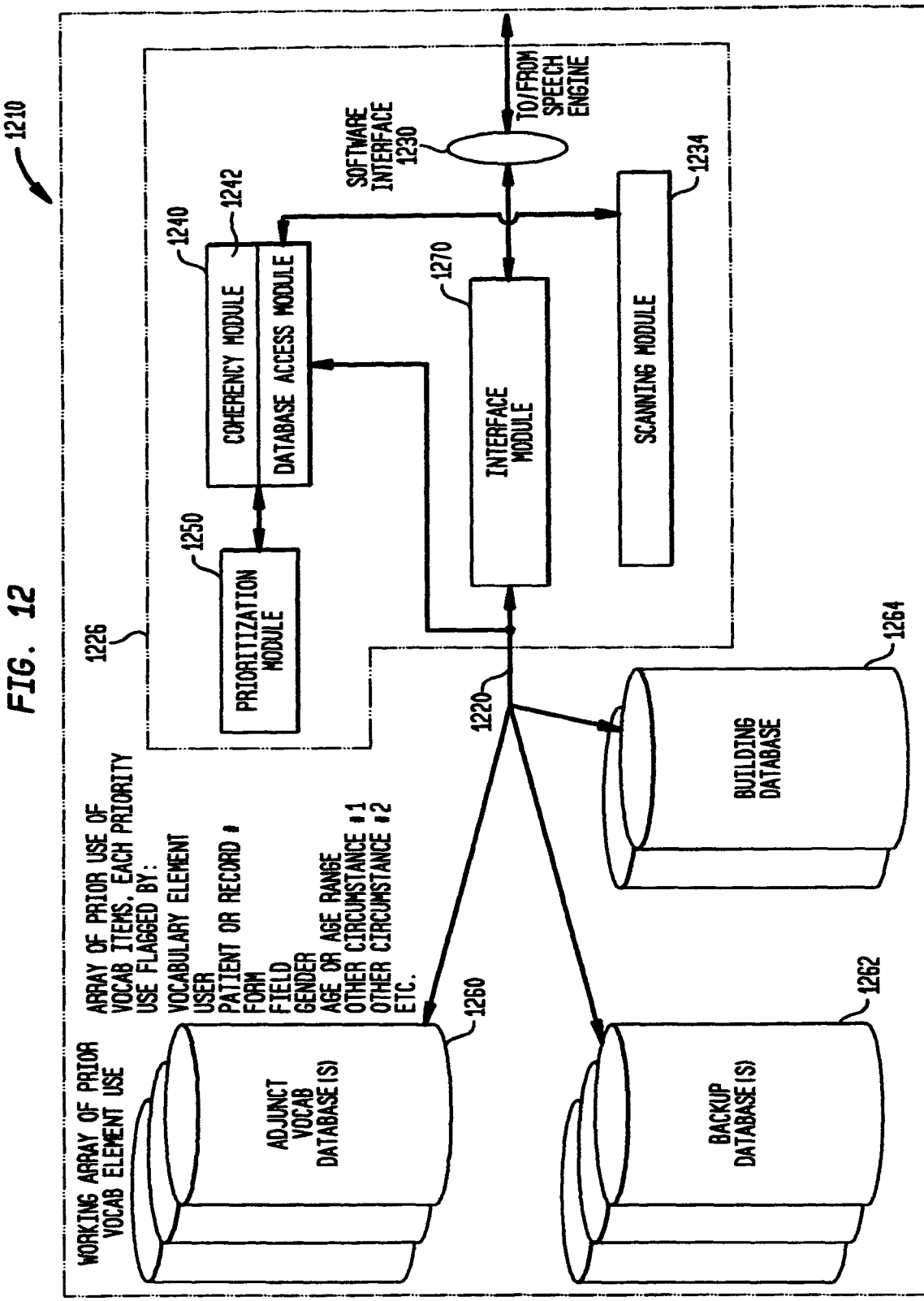
FIG. 12 is an exemplary software system and data organization for the record database and associated software according to another embodiment of the present invention.

Referring now to FIG. 12, a generalized virtual vocabulary and software system 1210 is provided, and as shown, and includes the virtual vocabulary database(s) 1260-1264. Virtual vocabulary software and data system 1210 includes a working virtual vocabulary database 1260, backup databases for the virtual vocabulary database 1262, and at least one operational building vocabulary database 1264. Physical data access to and between the databases is provided by software bus 1220. Virtual database management software 1226 is included within system 1210 and comprises numerous software modules for managing, accessing, sorting and searching the virtual vocabulary elements within the databases. In particular, database access module 1240 is provided to control all data access functions. Coherency module 1242 is provided as part of the database access module 1240 for coordination and maintenance of the data coherency of the various databases. A prioritization module 1250 is provided for use in prioritizing the virtual vocabulary elements within the databases. Scanning module 1234 is provided for repeatedly scanning and altering the data within the databases. Speech engine interface module 1270 is provided to process the incoming speech matching requests provided through software interface 1230 from the speech engine and returning the adjunct vocabulary elements in response to the same.

Figure 13:
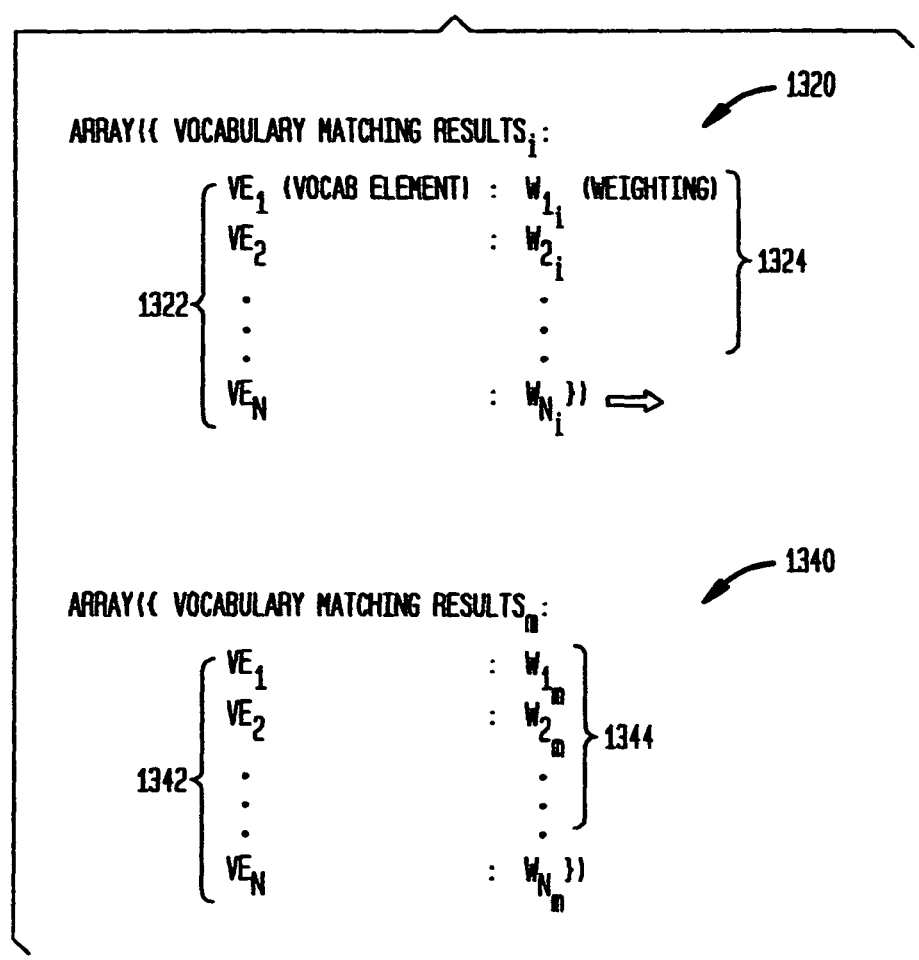
FIG. 13 is a data structure for the input and modified vocabulary element weightings according to another aspect of the present invention.

Referring now to FIG. 13, the general structure of the array of vocabulary element search results is provided as created by and passed from the search engine to the virtual vocabulary software system 1210. In particular and simply shown, the speech engine provides the virtual database system an initial dictation results array 1320 consisting of the list of potentially matching results (1322), VE1, VE2 . . . VEN and their corresponding initial weightings (1324) W1i, W2i . . . WNi. The virtual vocabulary software returns a modified dictation results array 1340 consisting of the same array of vocabulary elements (1342) VE1, VE2, . . . VEN with modified weightings as provided by the virtual vocabulary system according to one preferred embodiment, (1344) W1m, W2m . . . WNm. It should be noted that throughout the remainder of the discussion of the invention below, the input and modified dictation results arrays are discussed as if they were handled as singular entities, while in fact they may be accessed through the passing of pointers to these arrays and the vocabulary elements and weightings therein. Those of skill in the art will realize other, more efficient methods of accessing these arrays and the teachings of the present invention are independent of the method of accessing them in memory or through software. Further, the initial dictation results array and modified dictation results array are discussed as if they are different and distinct arrays. Those of skill in the art of database management will realized that the same data structure at a particular memory location may be used to store the vocabulary elements and initial weightings whereby the system, according to the present invention, simply replaces the initial weightings with modified weightings to create the modified dictation results array.

In operation, the software associated with the virtual vocabulary databases allows for very rapid operation of the re-weighting processes performed on the input dictation results array. At a high procedural level, re-weighting requests are issued from the operational software used with the record database system in the form of a function call to the virtual vocabulary database software. These function calls are issued as each field in the input interface to the record database is traversed by the system user. These function calls arrive at the virtual vocabulary software and data system 1210 though software interface 1270. Interface module 1270 distributes the request to prioritization module 1250 and scanning module 1234 which, in turn process the request as described in detail with respect to FIG. 14 below. Database access software 1240 with the assistance of coherency module 1242 manages access to the various virtual vocabulary databases 1260, 1262 and 1264 in satisfaction of the request processing. The input dictation results array is provided to the interface module 1270 though software interface 1230. Prioritization module 1250 performs the necessary weighting calculations, including any required normalizations, and returns the modified weightings to the interface module for population/replacement of initial weightings in the initial dictation results array to create the modified dictation results array. The modified dictation results array is then "returned" to the speech engine through to the interface module. All prioritization decisions and processing for this process are preferably performed by prioritization module 1250 for ease of searching and efficiency improvement purposes. Likewise, the scanning module is provided to continuously scan the numerous databases and input and update new virtual vocabulary elements, including updating use and weighting tags.

Referring now to FIG. 14, a detailed description is provided of the method of managing the virtual vocabularies according to a preferred embodiment of the present invention. Incoming analog speech is digitized and framed (1401) and acoustic information for vector mapping is extracted (1404). As described above, some incoming speech may be provided to the speech engine solely for use and matching as user-selected or programmed language which is to be matched only with commands or user defined speech. To cover this aspect, the speech engine attempts to match the acoustic information against system commands (1410), and then presuming no match, against user-defined commands (1413). If the search engine fails to match the voice input with systems and/or user-defined commands, the speech engine then attempts to match the acoustic input with default vocabulary terms, for example as a speech-to-text input to another piece of software with which the speech engine is working.

The overall processing of matching extracted acoustic information typically involves a two-step filtration process: a first step, coarse matching process that uses relatively minimal speech engine computational resources and which eliminates obvious non-matching vocabulary elements, and a second step, refined matching process that makes more extensive use of the speech engine's computational resources to achieve a good prioritization of the potential close matches returned by the first, coarse matching process. The coarse match is optimally positioned early in the overall process, for example, to follow closely after the extraction of acoustic information (1407). Positioning of the course filter immediately after the extraction of the acoustic information allows the course filter to use a minimally resource-intensive pass-fail criteria which may not only be used to make the above-mentioned match for system and user-defined commands but may also be used for paring down the initial, entire speech engine vocabulary (1418) so as to streamline the subsequent fine match process. The output of the course match process, regardless of the location and number of instantiations, is a sub-array of potential matching vocabulary elements from the entire (default) speech engine vocabulary, where each vocabulary element has a default or initial weighing associated with those vocabulary elements 1420

In alternative embodiments of this invention, the course filter may operate apart from the core speech recognition software of the speech recognition system such that it is accessed through a function call. This course filter could then also, conceivably be called by virtual speech recognition software to provide course screening of virtual vocabularies. Similarly, the course filter may also be called conceivably by the speech recognition software so as to pare down any other vocabularies used by the system such as the hierarchically organized vocabularies, that include prioritized and weighted sets of vocabulary elements, as shown in steps 919/1019, 934/1034, and 972/1072 and described in the accompanying text.

The refined filtration process according to this third embodiment of the invention and as provided within the prioritization module 1250 of FIG. 12, is shown in box 1450 in of FIG. 14. It should be noted that the illustrative example below pertaining to the operation of the invention in connection with a medical records database is provided strictly by way of illustration so as to simplify and clarify the operation of the invention.

As provided in step 1420, the initial dictation results array is provided with default or initial weights MXi (FIG. 13)—or w-D (FIG. 14). From this initial array in response to each speech input to the system, a modified dictation results array having a modified dictation result weighting WXm (FIG. 13) or w-C (FIG. 14) is to be created. As a first step in this process 1422, the virtual vocabulary database management software module 1226 compiles and identifies a set of hierarchical virtual sub-vocabularies according to a prioritization algorithm for a particular user installation. These virtual sub-vocabularies are preferably created from the raw text data associated with the records database and are formatted to include a virtual database of each text/vocabulary element ever used in the records database. During the compilation step 1422, each vocabulary element is tagged, as shown in FIG. 11, with a frequency of use for each criterion of relevance in the database the according to a particular prioritization criterion for the particular installation.

By way of example, the installation may be a three physician medical practice in which electronic medical record dictation is being performed. The relevant criteria for the instant database match may include identifying information for: 1) the dictating physician, 2) the patient to which the dictation refers, 3) a medical context for the patient to which the dictation pertains (e.g. allergy diagnosis); and 4) the electronic form field into which the speech-to-text output is to be provided. Given these criteria, the highest probability of a match against the input speech would be made within the virtual database management software if first virtual sub-vocabulary for matching a dictated medical record entry would include all the criteria above, which would be all terms that that the physician has dictated into that records database for that form filed for a particular patient context and having the particular medical problem being addressed (e.g. allergy). Additional, more general, lower priority and necessarily larger virtual sub-vocabularies may be created at step 1422 by relaxing one or more of the matching criteria in the formation of the first or previous virtual sub-directory. Further, cross-prioritized virtual sub-vocabularies may be created by combining different permutations of the full set of criteria and generating appropriate virtual sub-vocabularies. As a continuation of the example above, a next highest ($2^{nd}$) priority sub-vocabulary may include all vocabulary elements for that user, in the specified context (e.g. allergy) and dictated into that records form field, thereby eliminating the patient as a matching criterion for that database. A third priority virtual sub-vocabulary might be created to include consideration of every vocabulary element dictated by that user for that form field, thereby eliminating a patient context for that database. A fourth priority virtual sub-vocabulary might be created to include vocabulary elements used by all users of the system as dictated into that form filed for that context for that patient. A fifth priority sub-vocabulary might be created to include consideration of only all the vocabulary elements dictated by the user.

The virtual database management software then uses the calculated virtual sub-vocabularies to derive, modified weighting criteria for the input vocabulary elements. In steps 1425 though 1431 of FIG. 14, the input vocabulary element are matched against those within the first virtual sub-vocabulary and appropriate weighting adjustments are determined by the prioritization module. For example, any vocabulary elements input to the virtual database management system according to the general process described above with respect to FIG. 12 may be given an increase in prioritization weight of between 30% and 40% if they match any elements in the first virtual sub-vocabulary. The actual value in the range may depend, itself, on the number of matches in each criteria. It should be noted that the criteria themselves may be weighted to arrive at an appropriate weighting within the range above and optimize system accuracy. Table 2 below provided a sample modified weighting that may be applied to the initial weighting of vocabulary elements that match each of the criteria so as to arrive at the modified weighting for those vocabulary elements.

TABLE 2

First virtual sub-vocabulary modifications

| User matched | Field matched | Context matched | Patient matches | Total # of matches | Weighting modification |
|---|---|---|---|---|---|
| Yes | Yes | Yes | Yes | >20 | 40% |
| Yes | Yes | Yes | Yes | <20 and >10 | 37% |
| Yes | Yes | Yes | Yes | <20 and >4 | 32% |
| Yes(1) | Yes(1) | Yes(1) | Yes(1) | 4 | 30% |

Once the input dictation results array is retrieved 1425 and the weighting modifications are determined for each element in the first virtual sub-vocabulary, the modified weighing is applied to the initial weighing for each matching vocabulary element in the array (1427), or in the case of no match, the initial weighting is unaltered (1429). The prioritization module then applies the modified weightings to create an interim sub-vocabulary with partially modified weights (1431) and passes the interim sub-vocabulary to the next processing stage for comparison to the next ($2^{nd}$) virtual sub-vocabulary.

At step 1434, the same sequence of steps takes place as provided in steps 1425 to 1431 above: vocabulary element comparison to the next virtual sub-vocabulary; determination of appropriate weighting modifications based on vocabulary element matches in that vocabulary, and application of those modifications to the weightings in the vocabulary element array. In keeping with the medical records example above, the second virtual sub-vocabulary weightings may be as shown in table 3 below.

TABLE 3

Second virtual sub-vocabulary modifications

| User matched | Field matched | Context matched | Total # of matches | Weighting modification |
|---|---|---|---|---|
| Yes | Yes | Yes | >40 | 30% |
| Yes | Yes | Yes | <40 and >20 | 27% |
| Yes | Yes | Yes | <40 and >3 | 22% |
| Yes(1) | Yes(1) | Yes(1) | 3 | 20% |

Particular note should be made of several matters: 1) the total number matches will likely increase as the more generalized virtual vocabularies are scanned for matches; 2) the weighting modifications decrease (in absolute number)

as the array of vocabulary elements are matched against more generalized virtual vocabularies; and 3) these weights may be cumulatively derived through sequential processing steps of the vocabulary element array.

After the initial dictation results array is processed in view of each sequential virtual sub-vocabulary the resulting interim array with modified weights is passed to the next stage for processing against the next virtual sub-vocabulary (1437, 1440). At the end of the processing of the block of steps within block 1450, the prioritization module 1250 makes a final replacement of the default/initial weightings in the dictation results array (1442) and the virtual database management software returns the dictation results array to the speech engine for final selection of a matching vocabulary element (1444) based on the modified weightings provided by the system.

In one particularly preferred embodiment of the present invention, the processing steps of block 1450 are executed for each dictated input: virtual sub-vocabularies are created 1422, the initial dictation results array as provided by the speech engine is evaluated against each of the sequential virtual sub vocabularies, modified weightings for the vocabulary elements are applied and input to the array, and the array is returned to the speech engine for selection of a single appropriate matching vocabulary element based on the modified weightings.

In another particularly preferred embodiment, the compilation of the virtual sub-vocabularies may be altered over time and in response to a matching accuracy metric so as to achieve improved modified weightings and subsequent matches for the particular application/installation using the system.

Those of skill in the art will recognize that the specific examples of the methods provided above are for illustration purposes only and that certain normalizations of the statistical weightings may need to he performed to achieve a statistically accurate and properly functioning system.

Those of skill in the art will also realize that the linear weighting example provided above may be extended to include non-linear weightings for which normalization according to FIG. 10 and table 1 will have to be made to make the invention statistically operative. Further, the sequential processing of vocabulary elements within block 1450 may be combined with the teachings of cumulative sequential weighting as provided in the second embodiment of this invention (FIGS. 9, 10 and accompanying text)

Other elements of the system of the present invention may also be realized and implemented to achieve a more accurate, more efficiently functioning system. For example, utility programs may be included as part of the scanning module which are written to update the use tags each time an utterance is dictated into a specific field of a specific form, and another utility can periodically or constantly (for sufficiently busy systems) scan the database in background and update the various elements of these tags. As each entry in the database is date & time stamped, this background scanning utility may accommodate weighting schemes in which there is a time-dependent decay in weightings. For example, the utilities described in this paragraph could update tags for weighting schemes in which prioritization weights for prior use decline over time. It could appropriately generate and update tags, for example, according to an algorithm in which each prior use within the preceding 18 months has a weight of one unit, each prior use between 18 and 30 months previously will have a weight of 0.5 unit, and each prior use between 30 and 42 months earlier will have a weight of 0.25 unit.

The references specifically identified and discussed herein are incorporated by reference in their entirety as if fully set forth herein. Although the invention has been described with reference to specific exemplary embodiments thereof, it will be understood that numerous variations, modifications and additional embodiments are possible, and accordingly, all such variations, modifications, and embodiments are to be regarded as being within the spirit and scope of the invention. As such, the intended scope of the invention is intended to be limited only by the claims of the invention and not by any one aspect of the description provided above since the drawings and descriptions are to be regarded as illustrative in nature only.

What is claimed is:

1. A specified records database for use within, a speech recognition system, said specified records database including a plurality of data records, said speech recognition system having a speech recognition module that transcribes the dictated speech of a plurality of users of said speech recognition system into text strings, said text strings being stored as said plurality of data records, said specified records database comprising:

a plurality of user sub-databases, each user sub-database containing data records corresponding to the speech input of at least one user of said speech recognition system, each data record containing a plurality of data fields, said data fields containing text data corresponding to a dictated vocabulary element previously dictated into said speech recognition system by a user of said speech recognition system, at least one of said text data of said dictated vocabulary elements having an associated tag, said tag including weighting data based on a frequency of input and use of said previously dictated vocabulary element within said speech recognition system, said weighting data being updated following the dictation of said associated dictated vocabulary element by users of said speech recognition system, said text data of said dictated vocabulary element being used to provide a match to the dictated speech of said users of said speech recognition system.

2. The records database of claim 1 further comprising: a plurality of general data records, each general data record containing a plurality of data fields, said data fields containing a least one text string corresponding to a general vocabulary element, said general vocabulary element provided from a general vocabulary, said general vocabulary element not being previously dictated into said speech recognition system, said general vocabulary element having an associated tag, said tag including weighting data indicating a frequency of use, said general vocabulary element becoming a dictated vocabulary element within said speech recognition system and added to said user sub-database within said dictated data records once said general vocabulary element is dictated into said speech recognition system.

3. The specified records database of claim 1 wherein said vocabulary element is a single word text string.

4. The specified records database of claim 1 wherein said vocabulary element is a multiple word text string.

5. The specified records database of claim 1 wherein said vocabulary element is a phoneme.

6. The specified records database of claim 1 wherein said plurality of dictated data records are stored on a database located on the internet and said dictated vocabulary elements are generated at a dictation office connected to the internet, said weighting data of said tag associated with said dictated vocabulary element being updated when dictated at said dictation office.

7. The specified records database of claim 6 wherein said specified records database is an electronic medical records database and said dictated data records are patient data records.

8. The specified records database of claim 7 wherein said data fields include a medical code.

9. The specified records database of claim 1 wherein a first portion of said plurality of dictated data records are stored on a database located on the internet and a second portion of said plurality of dictated data records are stored in a dictation office connected to the internet, said dictated vocabulary elements within both said first and second portions being generated at said dictation office, said weighting data of said tags associated with said dictated vocabulary elements of both said first and second portions of said data records being updated when dictated at said dictation office.

10. The specified records database of claim 9 wherein said specified records database is an electronic medical records database, said dictated data records are patient data records, said first portion of said dictated data records including medical codes and said second portion of said dictated data records include patient data.

11. The specified records database of claim 1 wherein said weighting further indicates a frequency of input and use by a particular user of said speech recognition system.

12. The specified records database of claim 11 wherein said dictated vocabulary elements are selected by said speech recognition system for insertion into a computer-based form field.

13. A specified records database for use within a speech recognition system, said specified records database including a plurality of data records, said speech recognition system having a speech recognition module that transcribes the dictated speech of a plurality of users of said speech recognition system into text strings, said text strings being stored as said plurality of data records, said specified records database comprising:
    a plurality of form field sub-databases, each form field sub-database containing data records corresponding to the speech input of at least one user of said speech recognition system and as input by said user into a computer-based form, each data record containing a plurality of data fields, said data fields containing text data corresponding to a dictated vocabulary element previously-dictated into said speech recognition system by a user of said speech recognition system, at least one of said text data of said dictated vocabulary element having an associated tag, said tag including weighting data based on a frequency of input and use of said previously dictated vocabulary element within said speech recognition system, said weighting data being updated following the dictation of said associated dictated vocabulary element by users of said speech recognition system, said text data of said dictated vocabulary element being used to provide a match to the dictated speech of said users of said speech recognition system.

14. The specified records database of claim 13 further comprising:
    a plurality of general data records, each general data record containing a plurality of data fields, said data fields containing a least one text string corresponding to a general vocabulary element, said general vocabulary element provided from a general vocabulary, said general vocabulary element not previously dictated into said speech recognition system, said general vocabulary element having an associated tag, said tag including weighting data indicating a frequency of use, said general vocabulary element becoming a dictated vocabulary element and added to said form field sub-database within said dictated data records once said general vocabulary element is dictated into said speech recognition system.

15. The specified records database of claim 13 wherein said vocabulary element is a single word text string.

16. The specified records database of claim 13 wherein said vocabulary element is a multiple word text string.

17. The specified records database of claim 13 wherein said vocabulary element is a phoneme.

18. The specified records database of claim 13 wherein said plurality of dictated data records are stored on a database located on the internet and said dictated vocabulary elements are generated at a dictation office connected to the internet, said weighting data of said tag associated with said dictated vocabulary element being updated when dictated at said dictation office.

19. The specified records database of claim 18 wherein said records database is an electronic medical records database and said dictated data records are patient data records.

20. The specified records database of claim 18 wherein said data fields include a medical code.

21. The specified records database of claim 20 wherein a first portion of said plurality of dictated data records are stored on a database located on the internet and a second portion of said plurality of dictated data records are stored in a dictation office connected to the Internet, said dictated vocabulary elements within both said first and second portions being generated at said dictation office, said weighting data of said tags associated with said dictated vocabulary elements of both said first and second portions of said data records being updated when dictated at said dictation office.

22. The specified records database of claim 21 wherein said specified records database is an electronic medical records database, said dictated data records are patient data records, said first portion of said dictated data records including medical codes and said second portion of said dictated data records include patient data.

23. The records database of claim 13 wherein said weighting further indicates a frequency of input and use by a particular user of said speech recognition system.

* * * * *